(12) United States Patent  (10) Patent No.: US 7,607,592 B1
Kim  (45) Date of Patent: Oct. 27, 2009

(54) ACCESSORIES FOR WATER AND BEVERAGE BOTTLES

(76) Inventor: Sang B. Kim, 212 N. Duke St., Apt. 221, Durham, NC (US) 27701

( * ) Notice: Subject to any disclaimer, the term of this patent is extended or adjusted under 35 U.S.C. 154(b) by 701 days.

(21) Appl. No.: 11/269,938

(22) Filed: Nov. 8, 2005

Related U.S. Application Data

(60) Provisional application No. 60/626,119, filed on Nov. 8, 2004.

(51) Int. Cl.
| | | |
|---|---|---|
| *A01G 25/14* | (2006.01) | |
| *B05B 9/00* | (2006.01) | |
| *B05B 1/30* | (2006.01) | |

(52) U.S. Cl. .................. 239/377; 239/376; 239/379; 239/571; 239/577; 239/583

(58) Field of Classification Search ............. 239/333, 239/345, 583, 577, 571, 377, 379, 376, 350; 222/402.19, 376, 321.4
See application file for complete search history.

(56) References Cited

U.S. PATENT DOCUMENTS

| | | | |
|---|---|---|---|
| 1,730,684 | A | 10/1929 | Phillips |
| 1,896,405 | A | 2/1933 | Hauser |
| 2,185,608 | A | 1/1940 | Rose |
| 2,766,796 | A | 10/1956 | Tupper |
| 2,880,939 | A | 4/1959 | Esmay |
| D189,393 | S | 12/1960 | Schulmbohm |
| 3,029,001 | A | 4/1962 | Blish |
| 3,116,856 | A | 1/1964 | Prussin |
| 3,369,713 | A | 2/1968 | Godschalk |
| 3,379,136 | A | 4/1968 | Corsette |
| 3,447,551 | A | 6/1969 | Braun |
| 3,753,518 | A | 8/1973 | Kutik |
| 3,799,448 | A | 3/1974 | Nozawa |
| 3,998,363 | A | 12/1976 | Beres |
| 4,025,587 | A | 5/1977 | Schuster |
| 4,129,235 | A | 12/1978 | Haas |
| 4,196,828 | A | 4/1980 | Basile |
| 4,197,942 | A | 4/1980 | Gacki |
| 4,206,877 | A | 6/1980 | Hoza |
| 4,324,362 | A | 4/1982 | Stansbury |
| 4,346,048 | A | 8/1982 | Gates |

(Continued)

FOREIGN PATENT DOCUMENTS

FR 754269 11/1933

(Continued)

OTHER PUBLICATIONS www.WATERSUMMIT.com, "Aqua Mist—Personal Water Misting System." 4-pg Internet printout on Mar. 28, 2004; unknown first publ. date.

(Continued)

*Primary Examiner*—Len Tran
*Assistant Examiner*—Justin Jonaitis
(74) *Attorney, Agent, or Firm*—Law Office of Daivd Hong

(57) ABSTRACT

An apparatus for accessorizing water and beverage bottles, including a water mister, a portable humidifier, a vitamin or nutritional supplement dispenser, and other useful accessories, which are quickly, easily, and removably attached to any commercially available consumer water or beverage bottle or container.

7 Claims, 24 Drawing Sheets

U.S. PATENT DOCUMENTS

| | | | |
|---|---|---|---|
| 4,371,098 A * | 2/1983 | Nozawa et al. | 222/321.4 |
| 4,384,960 A | 5/1983 | Polley | |
| 4,440,390 A | 4/1984 | Bailey | |
| 4,458,830 A | 7/1984 | Werding | |
| 4,481,986 A | 11/1984 | Meyers | |
| 4,526,298 A | 7/1985 | Boxer | |
| 4,548,828 A | 10/1985 | Meyers | |
| 4,563,313 A | 1/1986 | Tsuaki | |
| RE32,142 E | 5/1986 | Meyers | |
| 4,614,267 A | 9/1986 | Larkin | |
| 4,643,351 A | 2/1987 | Fukamachi | |
| 4,644,790 A | 2/1987 | Mizoguchi | |
| 4,752,423 A | 6/1988 | Wong | |
| 4,775,079 A * | 10/1988 | Grothoff | 222/321.4 |
| 4,776,498 A | 10/1988 | Maerte | |
| 4,813,609 A | 3/1989 | French | |
| 4,820,453 A | 4/1989 | Huang | |
| 4,846,236 A | 7/1989 | Deruntz | |
| 4,853,161 A | 8/1989 | Huang | |
| 4,882,096 A | 11/1989 | Rueben | |
| 4,921,639 A | 5/1990 | Chiu | |
| 4,932,563 A | 6/1990 | Diamond | |
| 4,979,654 A | 12/1990 | Nohren | |
| 5,045,195 A | 9/1991 | Spangrud | |
| 5,060,833 A | 10/1991 | Edison | |
| 5,104,016 A | 4/1992 | Runkel | |
| 5,115,980 A * | 5/1992 | Skorka | 222/376 |
| 5,131,070 A | 7/1992 | Chiu | |
| 5,211,973 A | 5/1993 | Nohren | |
| 5,217,307 A | 6/1993 | McClintock | |
| 5,250,232 A | 10/1993 | Pepper | |
| 5,252,260 A | 10/1993 | Schuman | |
| 5,273,649 A | 12/1993 | Magnusson | |
| 5,360,338 A | 11/1994 | Waggoner | |
| 5,381,509 A | 1/1995 | Mills | |
| 5,397,510 A | 3/1995 | Clark | |
| 5,431,813 A | 7/1995 | Daniels | |
| 5,474,210 A | 12/1995 | Boyd | |
| 5,476,198 A | 12/1995 | Jouillat | |
| 5,480,588 A | 1/1996 | Tomasiak | |
| 5,519,900 A | 5/1996 | Gardner | |
| 5,525,223 A | 6/1996 | Butler | |
| 5,531,681 A | 7/1996 | Walton | |
| 5,531,734 A | 7/1996 | Geckle | |
| 5,533,973 A | 7/1996 | Piontek | |
| 5,535,596 A | 7/1996 | Todak | |
| 5,547,615 A | 8/1996 | Jane | |
| 5,598,971 A | 2/1997 | Winther | |
| 5,609,759 A | 3/1997 | Nohren | |
| 5,613,371 A | 3/1997 | Nelson | |
| 5,620,140 A | 4/1997 | Utter | |
| 5,632,399 A | 5/1997 | Palmieri | |
| 5,642,570 A | 7/1997 | Lee | |
| 5,652,826 A | 7/1997 | Mills | |
| 5,667,732 A | 9/1997 | Lederer | |
| 5,674,391 A | 10/1997 | Nohren | |
| 5,681,463 A | 10/1997 | Shimizu | |
| 5,682,932 A | 11/1997 | Ediger | |
| 5,698,222 A | 12/1997 | Mazer | |
| 5,738,651 A | 4/1998 | Walton | |
| 5,741,243 A | 4/1998 | Geckle | |
| 5,755,688 A | 5/1998 | Piontek | |
| 5,788,125 A | 8/1998 | Steiner | |
| 5,792,390 A | 8/1998 | Marino | |
| 5,799,873 A | 9/1998 | Lau | |
| 5,810,001 A | 9/1998 | Genga | |
| 5,837,167 A | 11/1998 | Lederer | |
| 5,850,947 A * | 12/1998 | Kim | 222/321.4 |
| 5,918,804 A | 7/1999 | Jung | |
| 5,921,416 A | 7/1999 | Uchara | |
| 5,921,955 A | 7/1999 | Mazer | |
| 5,936,178 A | 8/1999 | Saari | |
| 6,010,034 A | 1/2000 | Walthers | |
| 6,024,264 A | 2/2000 | Java | |
| 6,036,669 A | 3/2000 | Cole | |
| 6,075,963 A | 6/2000 | Ichikawa | |
| 6,086,910 A | 7/2000 | Howard | |
| 6,095,434 A | 8/2000 | Montenegro | |
| 6,135,427 A | 10/2000 | Tsai | |
| 6,161,777 A | 12/2000 | Carter | |
| 6,176,474 B1 | 1/2001 | Stanek | |
| 6,179,170 B1 | 1/2001 | Bachand | |
| 6,189,805 B1 | 2/2001 | West | |
| 6,216,961 B1 | 4/2001 | Utter | |
| 6,217,294 B1 | 4/2001 | Arnieri | |
| 6,221,416 B1 | 4/2001 | Nohren | |
| 6,247,995 B1 | 6/2001 | Bryan | |
| 6,264,120 B1 | 7/2001 | Wintering | |
| 6,277,092 B1 | 8/2001 | Cole | |
| 6,305,769 B1 | 10/2001 | Thayer | |
| 6,371,388 B2 | 4/2002 | Utter | |
| 6,398,132 B1 | 6/2002 | Junkel | |
| 6,431,408 B1 | 8/2002 | DeLaforcade | |
| 6,439,389 B1 | 8/2002 | Mogil | |
| 6,471,194 B2 | 10/2002 | Keeney | |
| 6,481,642 B1 | 11/2002 | Louis | |
| 6,497,345 B1 | 12/2002 | Wilker | |
| 6,540,112 B1 | 4/2003 | Studnik | |
| 6,601,739 B2 | 8/2003 | Lacout | |
| 6,609,820 B2 | 8/2003 | Litwiller | |
| 6,634,138 B2 | 10/2003 | Katzman | |
| 6,640,805 B2 * | 11/2003 | Castro et al. | 128/200.23 |
| 6,644,564 B2 | 11/2003 | Perkitny | |
| 6,652,766 B1 | 11/2003 | Frankenbach | |
| 6,672,485 B2 | 1/2004 | Mascitelli | |
| 6,681,958 B2 | 1/2004 | Sorenson | |
| 6,926,175 B2 * | 8/2005 | Choi et al. | 222/321.7 |
| 7,104,468 B2 | 9/2006 | Stengel | |
| 2001/0004091 A1 | 6/2001 | Wintering | |
| 2002/0020302 A1 | 2/2002 | Heczko | |
| 2002/0033365 A1 | 3/2002 | Patil | |
| 2002/0036176 A1 | 3/2002 | Hughes | |
| 2002/0079271 A1 | 6/2002 | Baca | |
| 2002/0090426 A1 | 7/2002 | Denny | |
| 2002/0132214 A1 | 9/2002 | Mattson | |
| 2002/0195415 A1 | 12/2002 | Kim | |
| 2003/0000907 A1 | 1/2003 | Kevorkian | |
| 2003/0000961 A1 | 1/2003 | Klima | |
| 2003/0010744 A1 | 1/2003 | Ma | |
| 2003/0029789 A1 | 2/2003 | Patil | |
| 2003/0071089 A1 | 4/2003 | Ma | |
| 2003/0164559 A1 | 9/2003 | Rhea | |
| 2003/0164561 A1 | 9/2003 | Rhea | |
| 2003/0168474 A1 | 9/2003 | Widgery | |
| 2003/0218076 A1 | 11/2003 | Farnsworth | |
| 2003/0230546 A1 | 12/2003 | Yurkewicz | |
| 2003/0234059 A1 | 12/2003 | Lim | |
| 2004/0037834 A1 | 2/2004 | Woloski | |
| 2004/0047231 A1 | 3/2004 | Coll | |
| 2005/0135186 A1 | 6/2005 | Mbakop | |

FOREIGN PATENT DOCUMENTS

| | | |
|---|---|---|
| GB | 412374 | 6/1934 |
| JP | 62218759 | 9/1987 |
| JP | 62242741 | 10/1987 |
| JP | 4278138 | 10/1992 |

OTHER PUBLICATIONS www.BLUEMOONMISTCOMPANY.com, "Misting Products." 6-pg Internet printout on Mar. 28, 2004; unknown first publ. date.

www.FESFLOWERS.com, "Related products." 7-pg Internet printout on Mar. 28, 2004; unknown first publ. date.

www.GOFLOW.net, "Versamist." 2-pg Internet printout on Mar. 28, 2004; unknown first publ. date.

www.PREPAREDNESS.com, "Handheld cool water misting fan with strap." 2-pg Internet printout on Mar. 28, 2004; unknown first publ. date.

www.SAFETYCENTRAL.com, "Handheld cool water misting fan with strap." 2-pg Internet printout on Mar. 28, 2004; unknown first publ. date.

www.EBAY.com member OMIDORI"Misting Humidifier," 3-pg Internet printout on Mar. 28, 2004; unknown first publ. date.

www.MISTYMATE.com, "Instructions." 4-pg Internet printout on Mar. 28, 2004; unknown first publ. date.

www.DOGPILE.com. "Misting and top and bottle." 12-page Internet printout on Mar. 28, 2004.

www.DOGPILE.com, "personal portable humidifier water bottle top." 8-page Internet printout on Mar. 29, 2004.

vvww.GADGETBABE.com, "Megasonic Aroma Diffuser." 1-pg Internet printout on Mar. 29, 2004; unknown first publ. date.

www.ANNMORRIS.com, "EPF3." 1-pg Internet printout on Mar. 29, 2004; unknown first publ. date.

www.DOGPILE.com, "mini humidifier water bottle." 4-pg Internet printout on Mar. 29, 2004; unknown first publ.

www.e-tradepages.com, "Compact personal humidifier." 2-pg Internet printout on Mar. 29, 2004; unknown first publ.

www.ECOPATH.com, "XJ-700 Mini-humidifier." 3-pg Internet printout on Mar. 29, 2004; unknown first publ.

www.HUMIDIFIERSDIRECT.com, "Mini-humidifier." 7-pg Internet printout on Mar. 29, 2004; unknown first publ.

\* cited by examiner

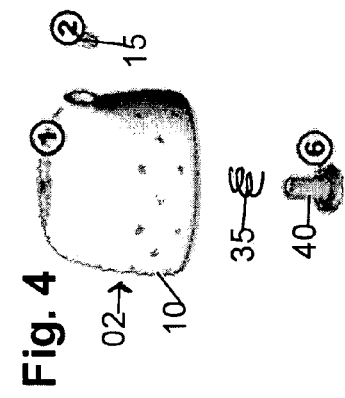
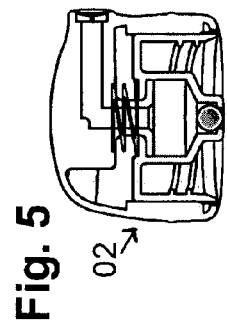
Fig. 4
Fig. 5
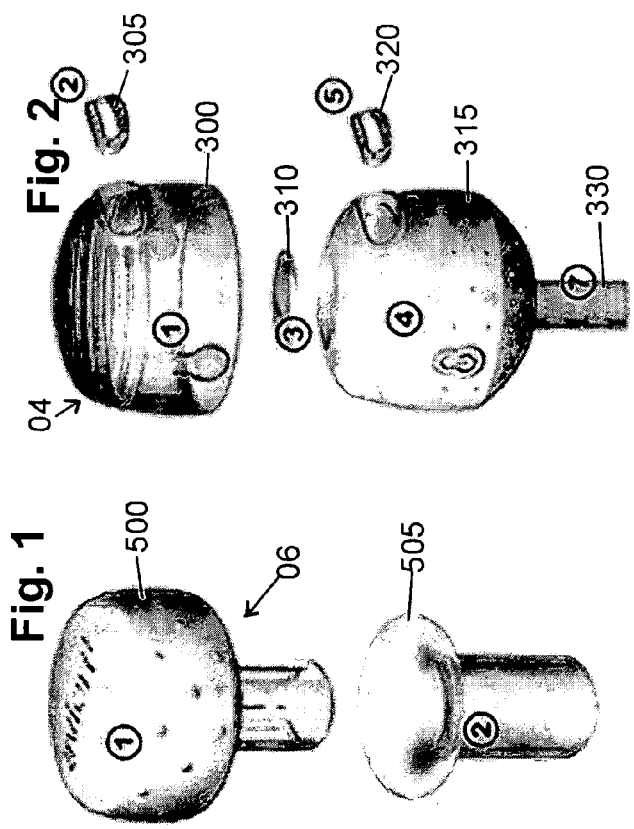
Fig. 2
Fig. 1
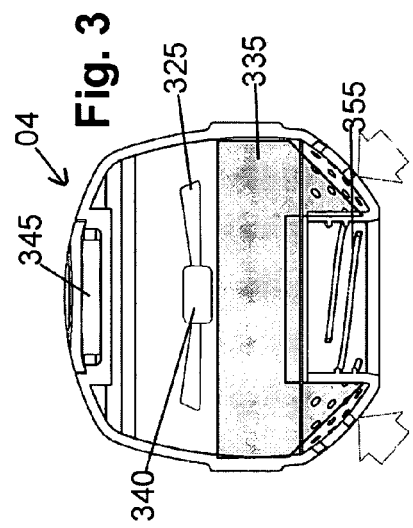
Fig. 3

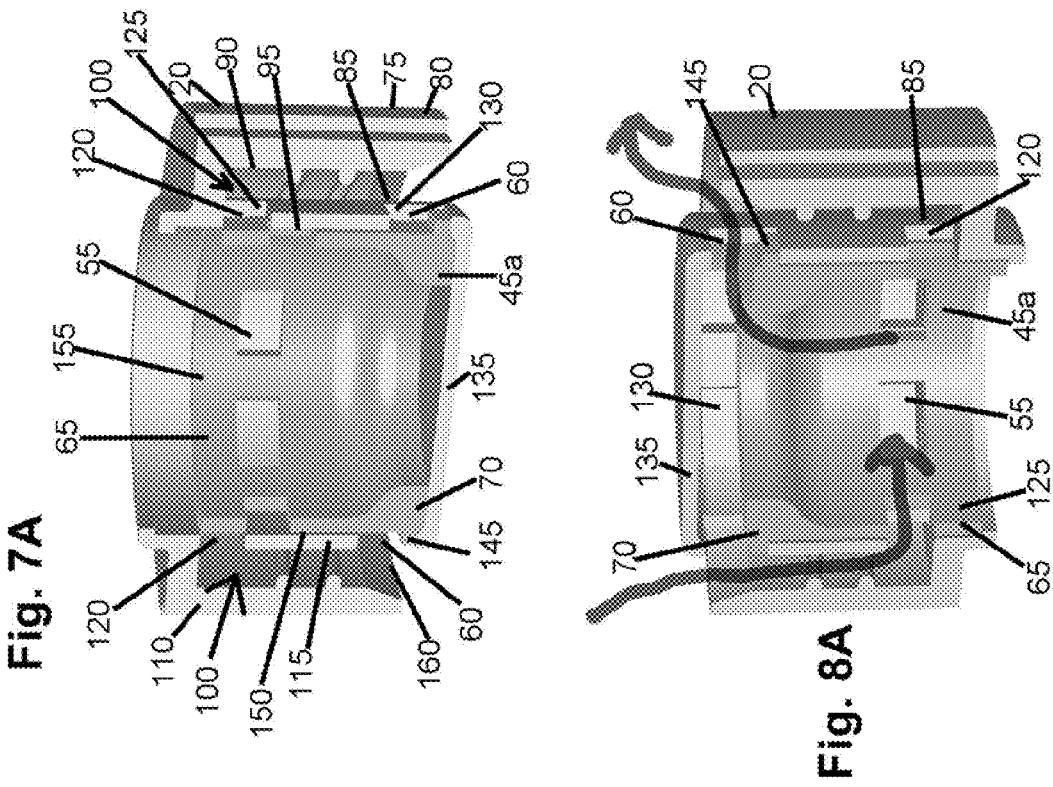
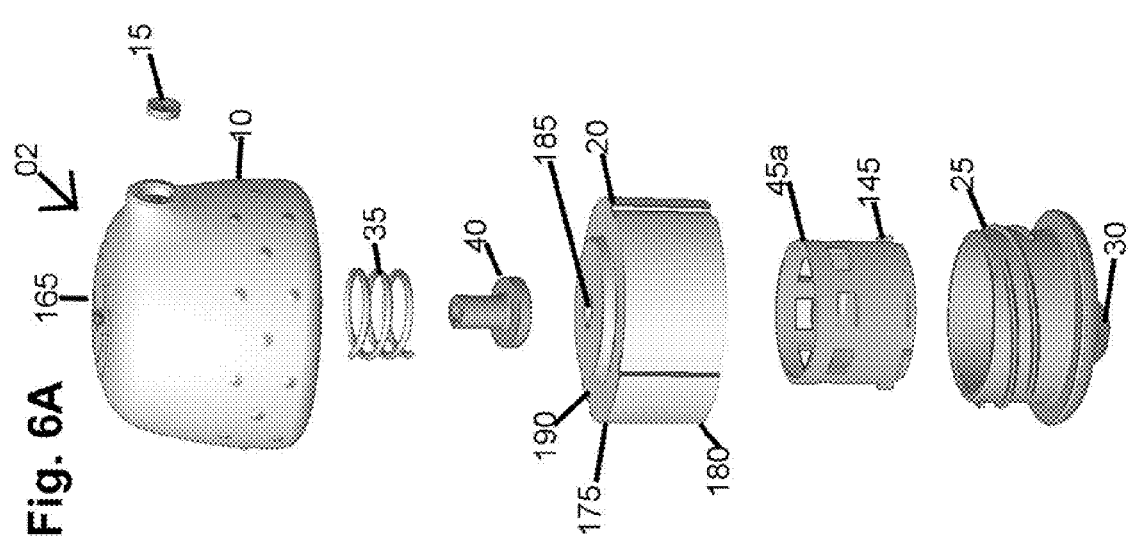

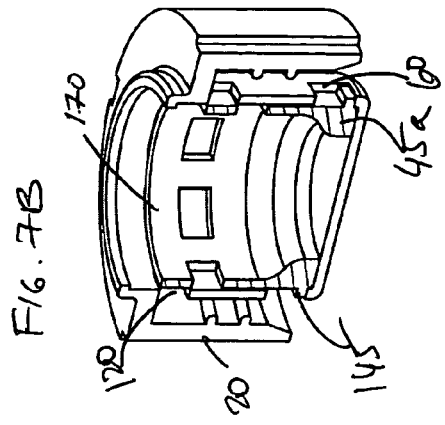
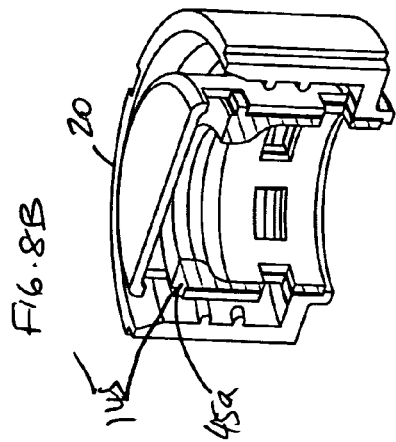
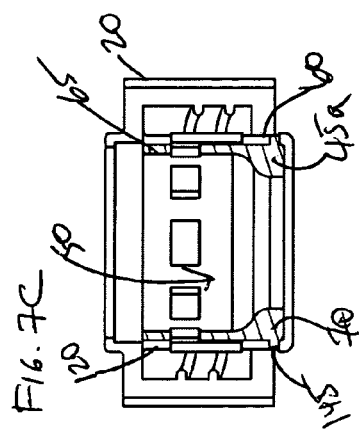
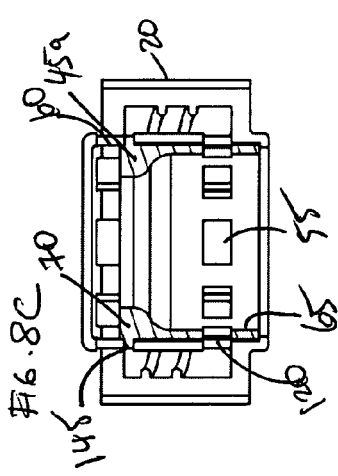
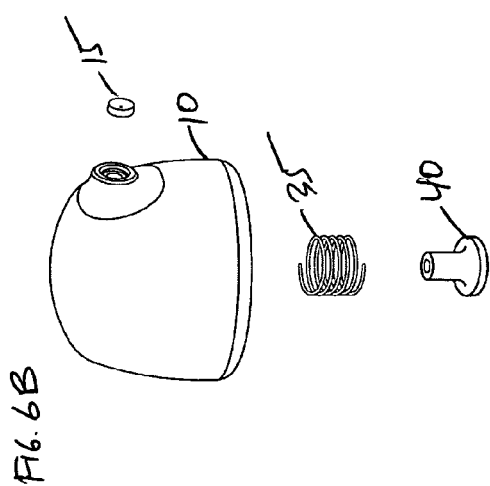
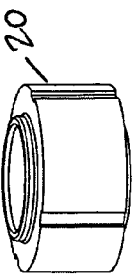
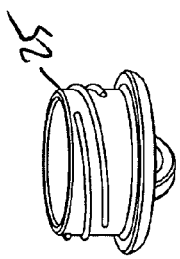

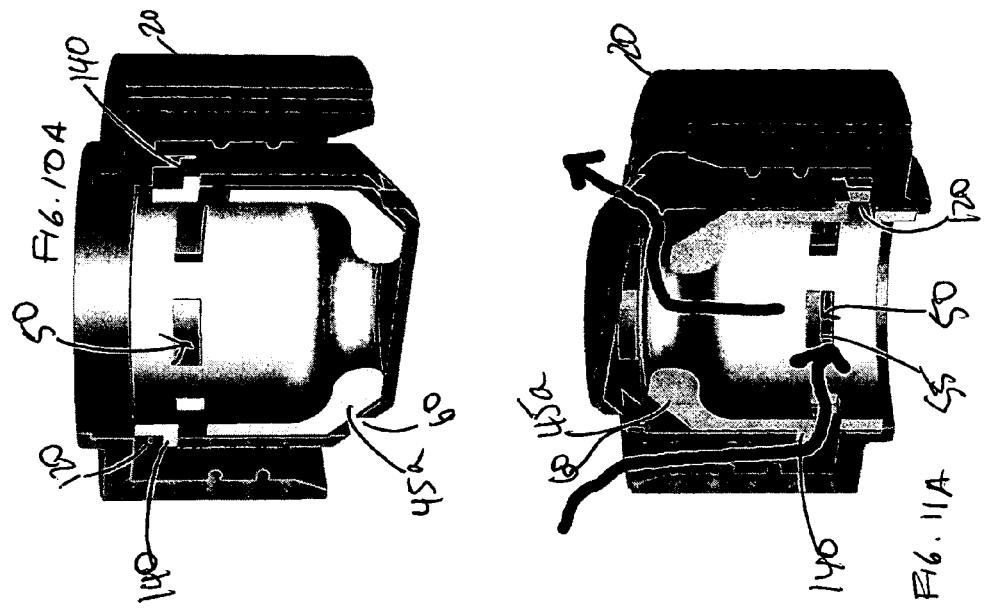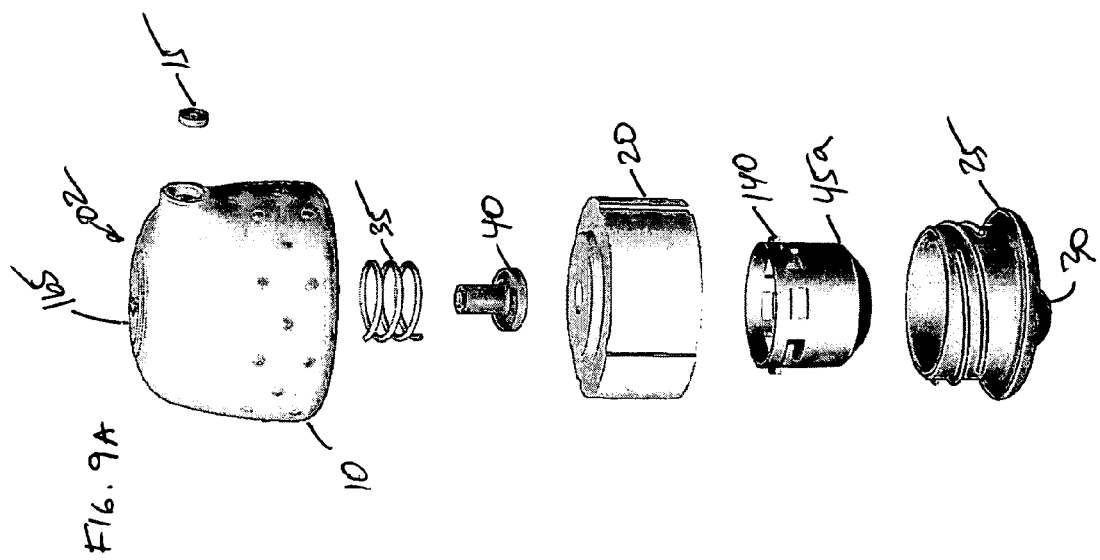

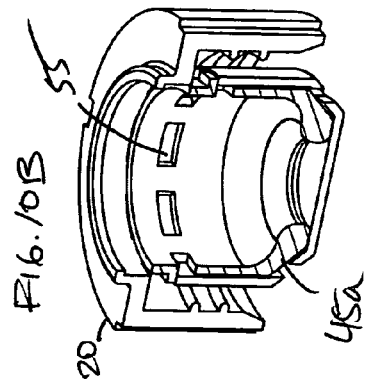
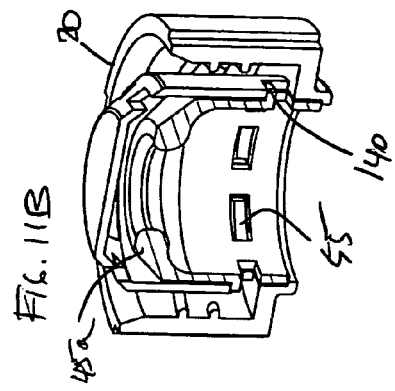
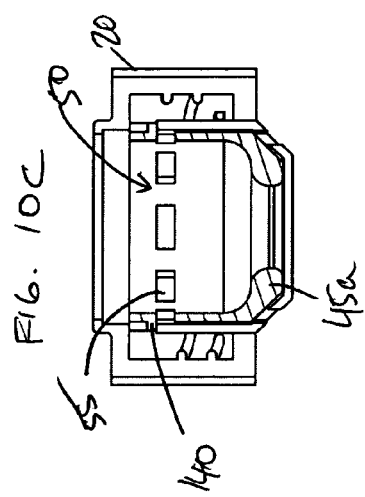
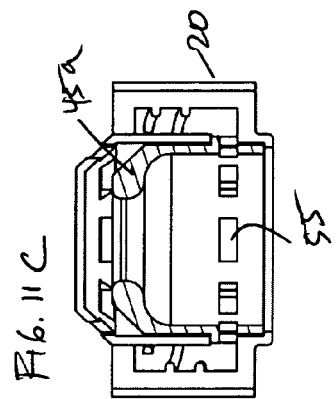
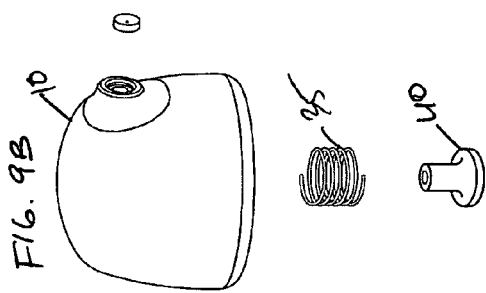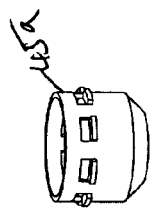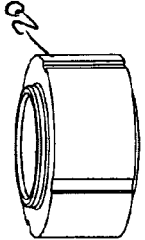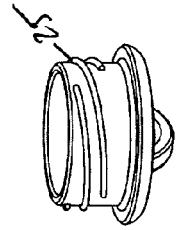

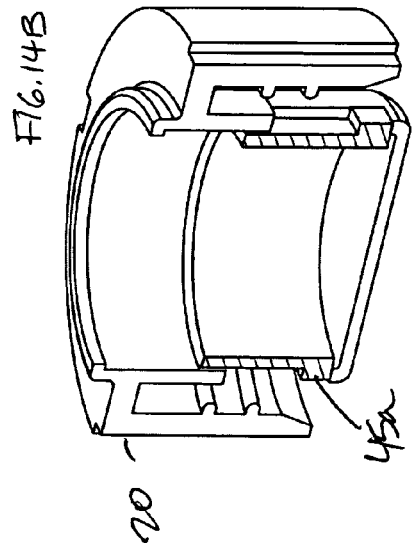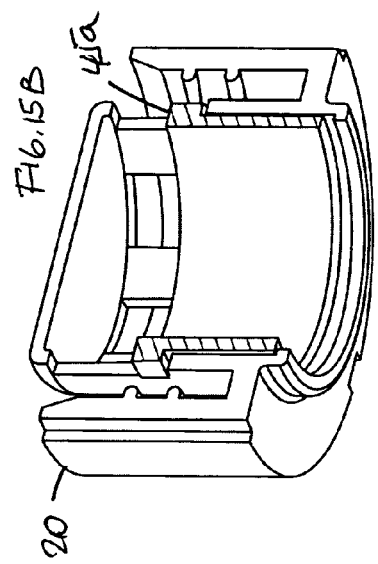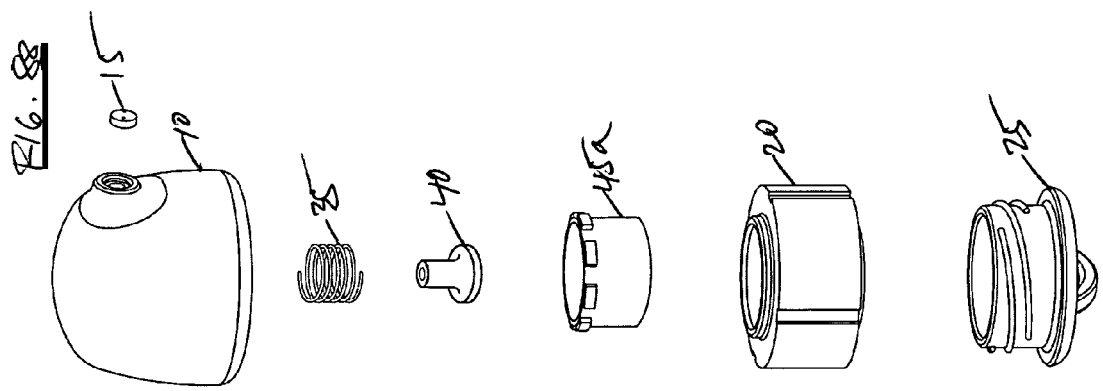

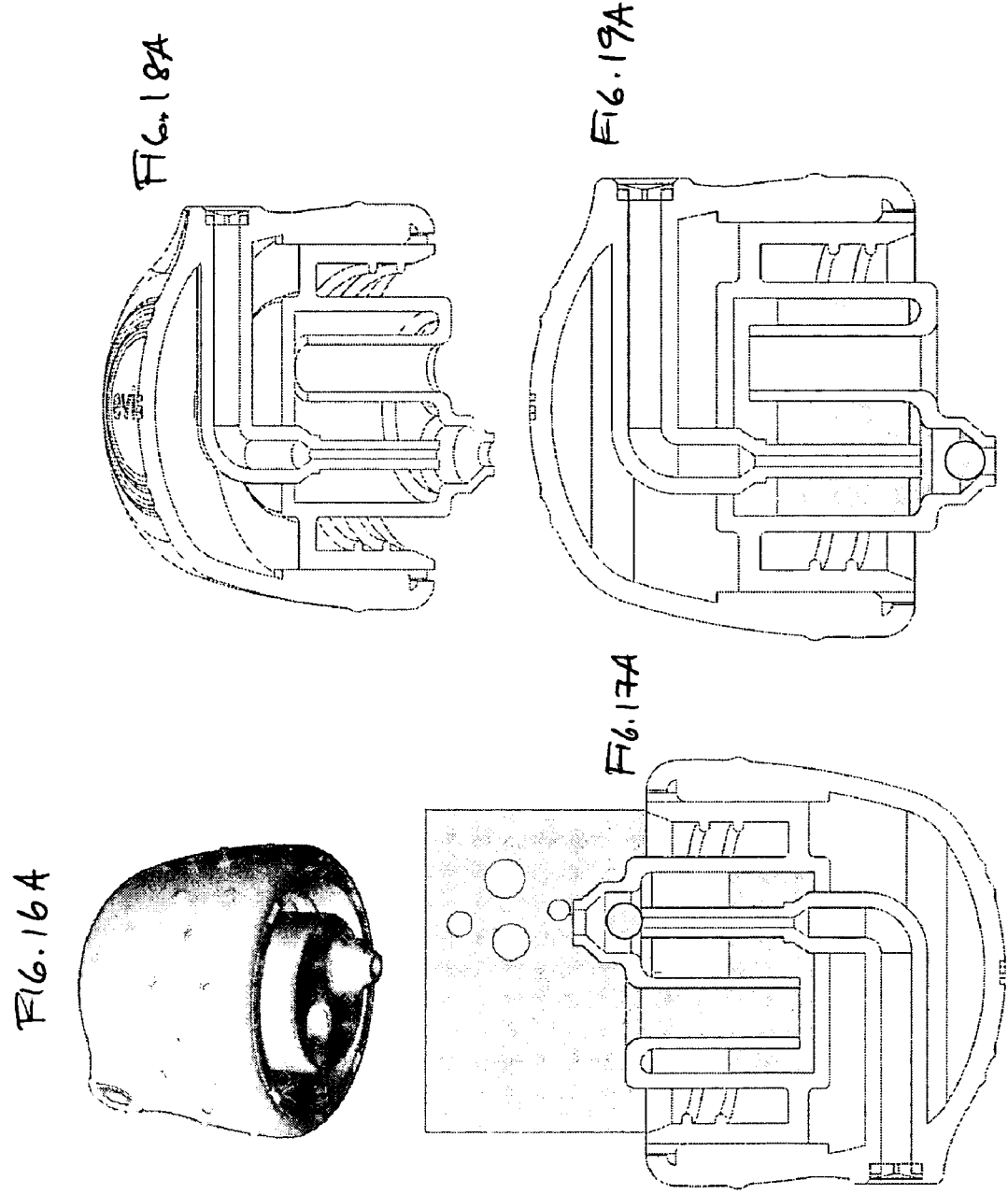

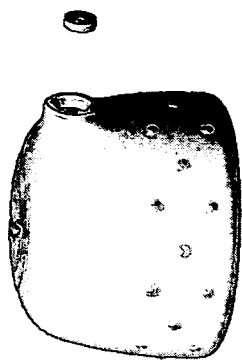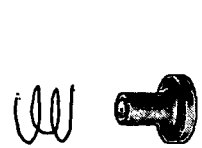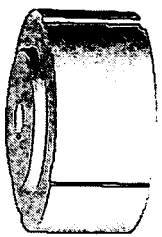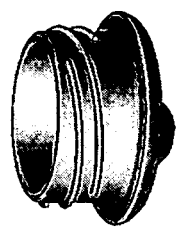
FIG. 22
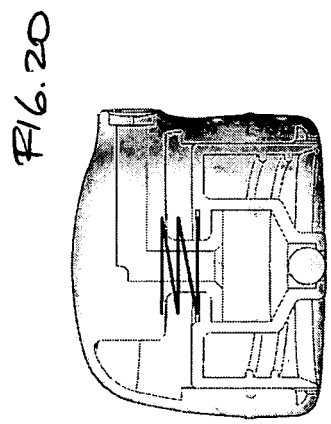
FIG. 20
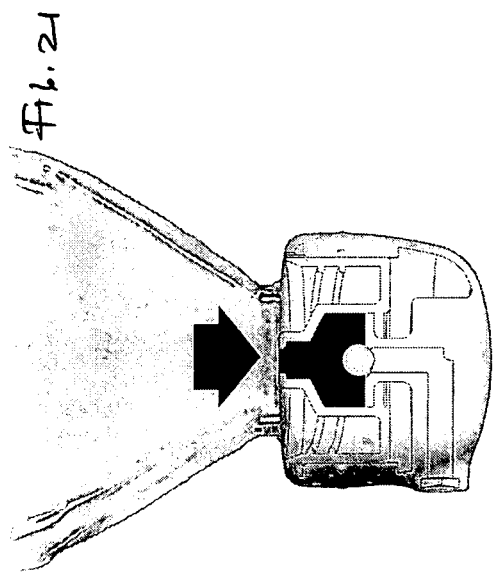
FIG. 21

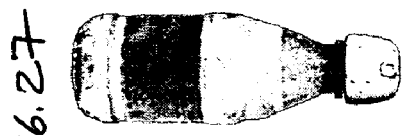
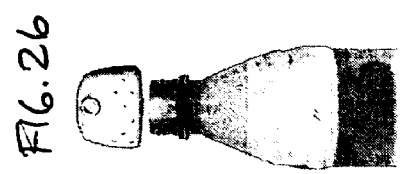
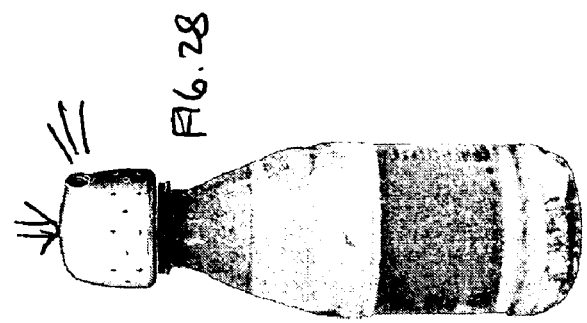
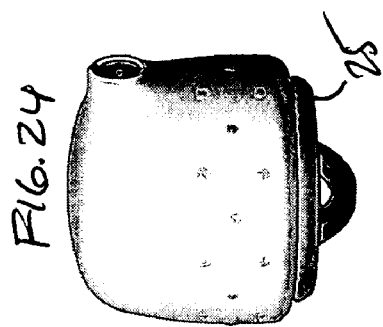
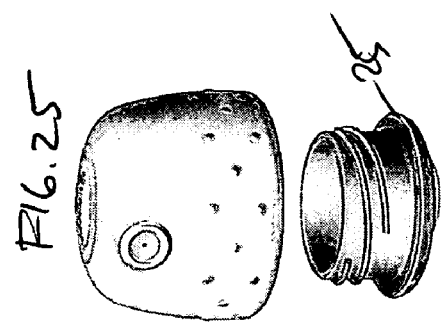
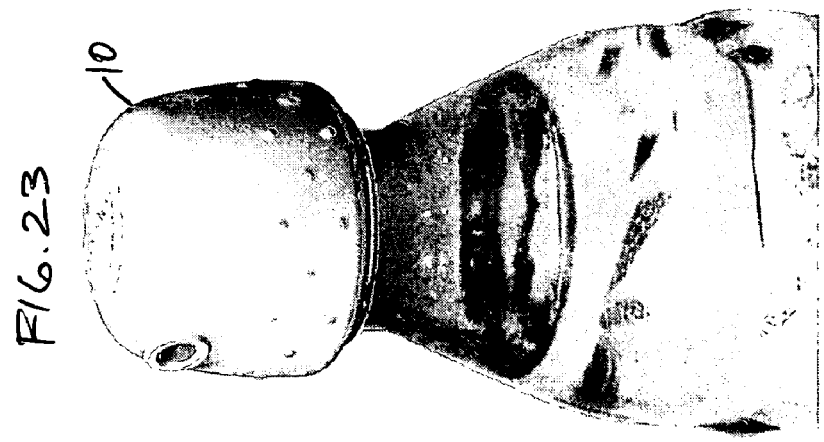

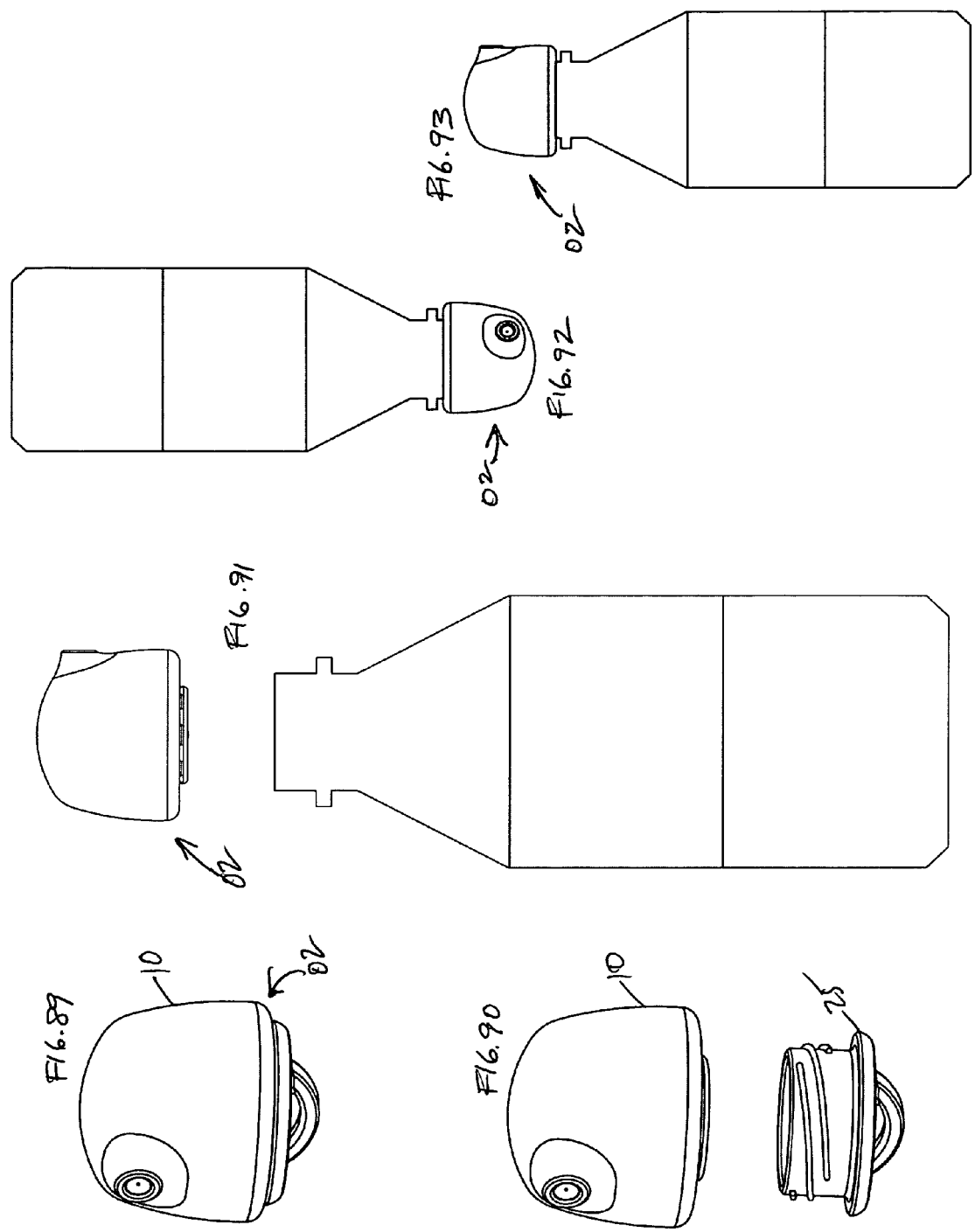

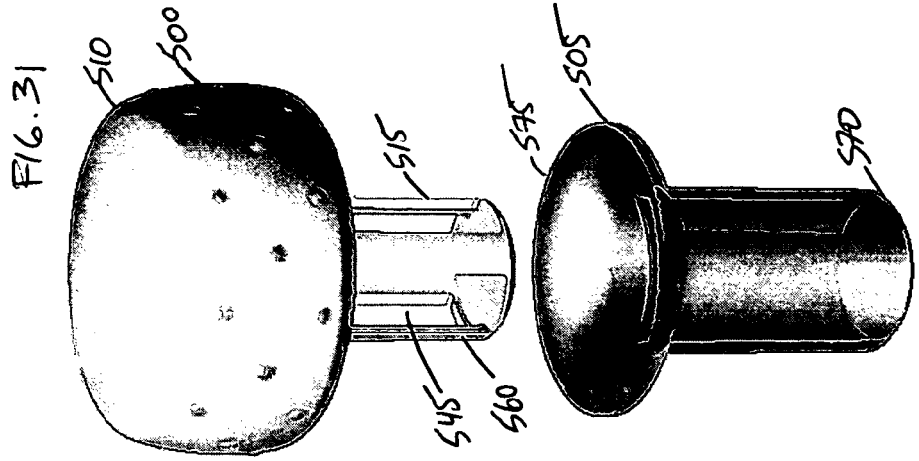
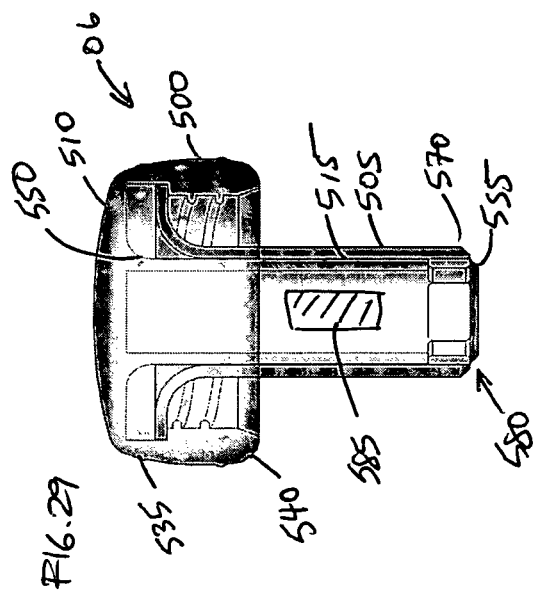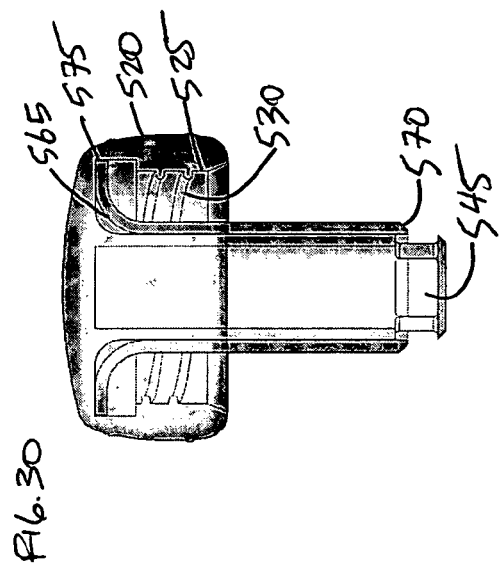

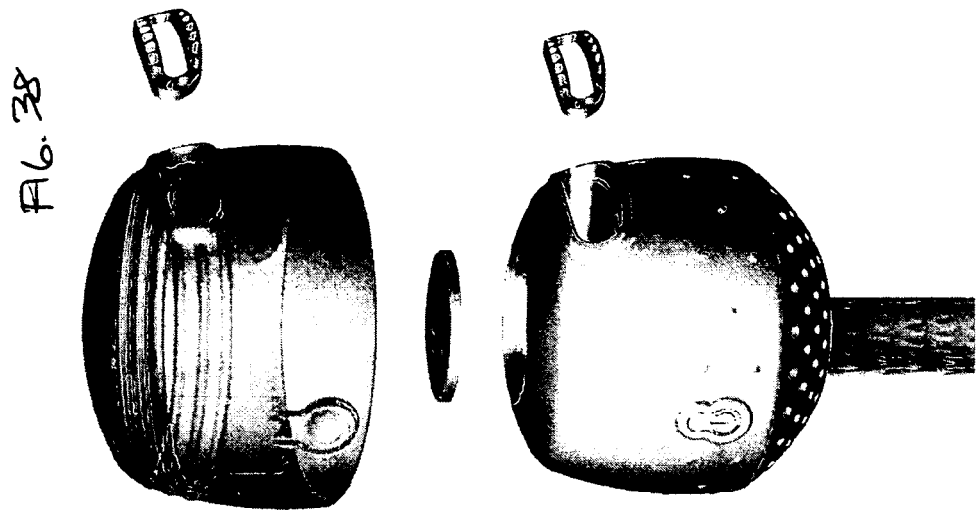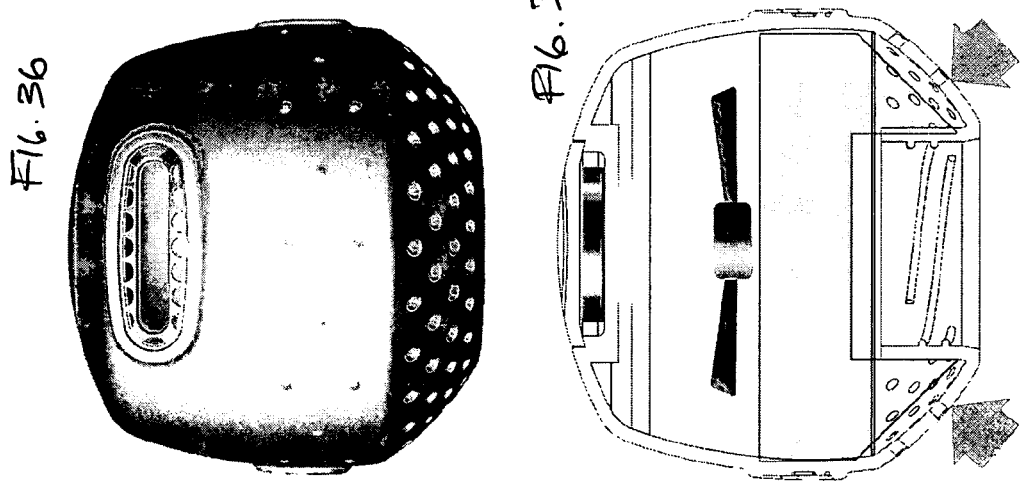

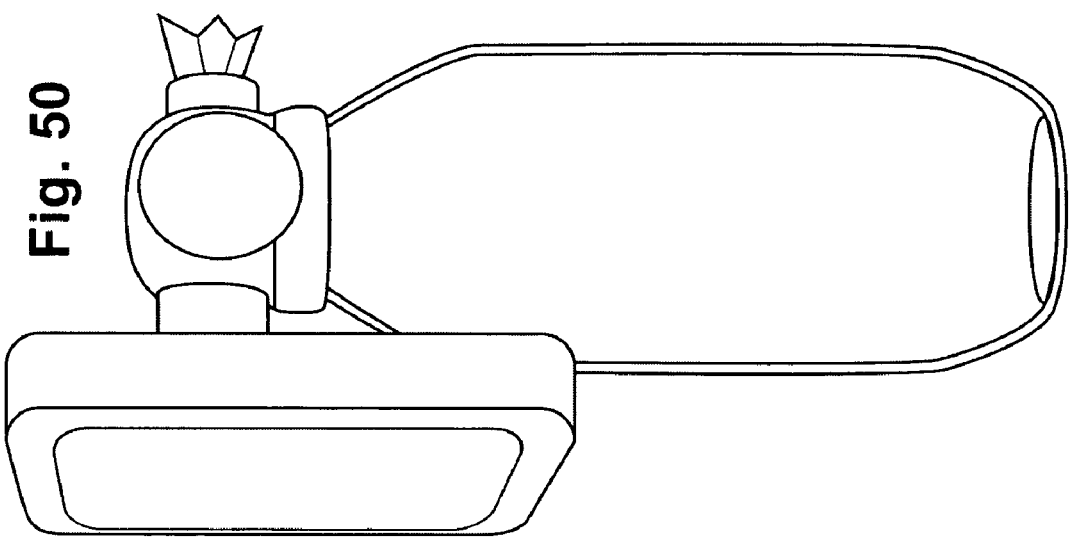

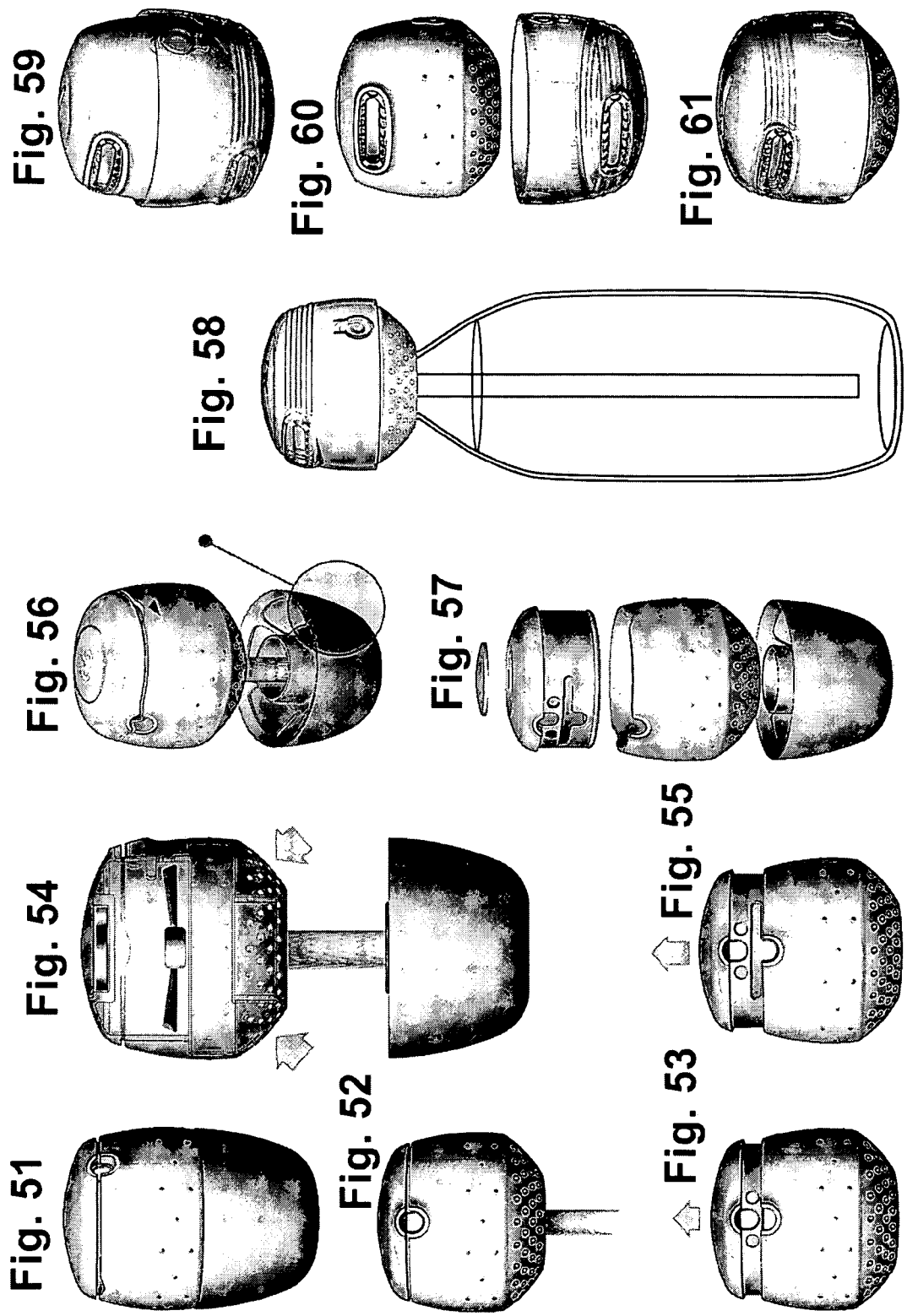

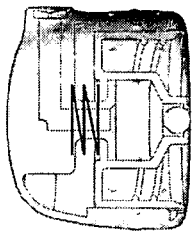
Fig. 70
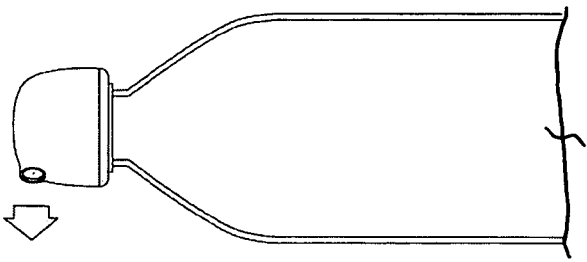
Fig. 72
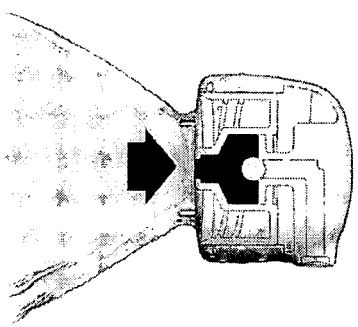
Fig. 71
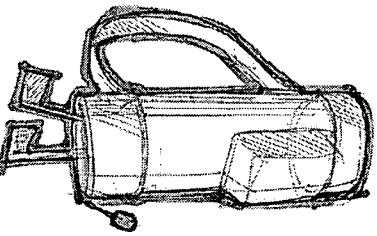
Fig. 66
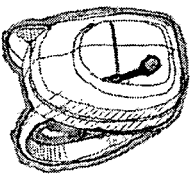
Fig. 69
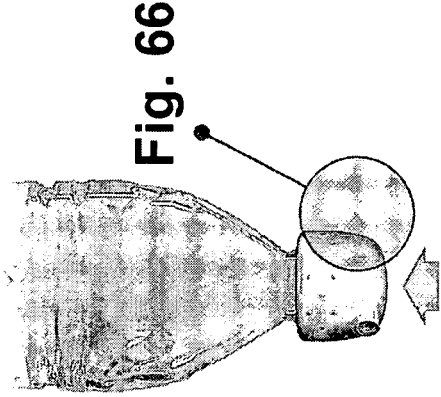
Fig. 64 Fig. 65 Fig. 68
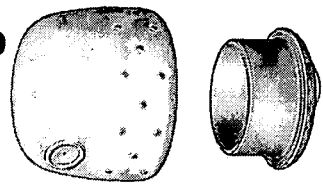
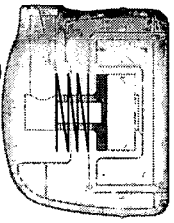
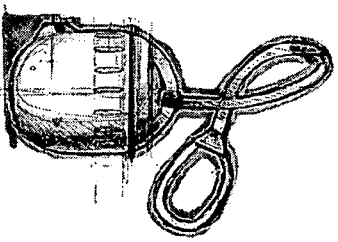
Fig. 62 Fig. 63 Fig. 67
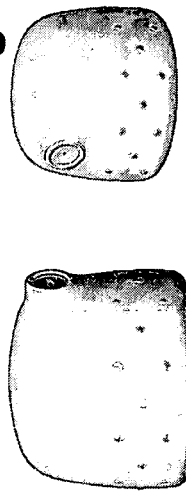
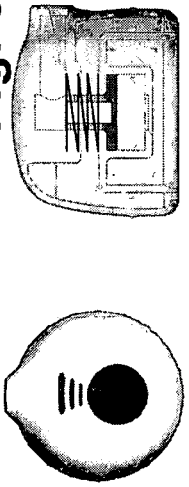

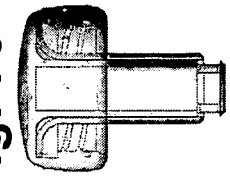
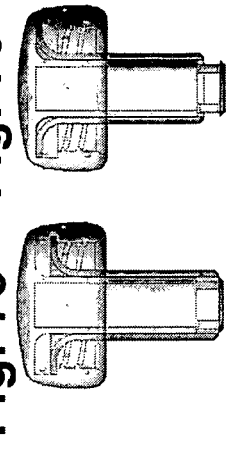
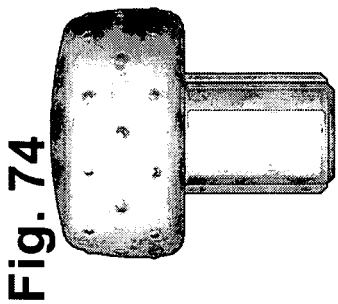
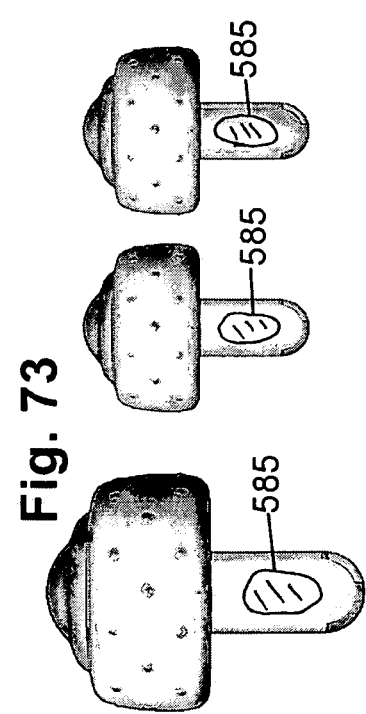
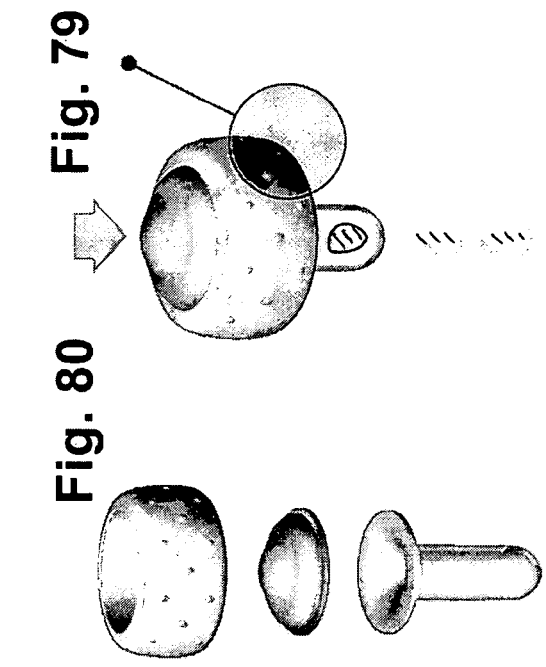

ated description, with reference to the appended drawings.

ACCESSORIES FOR WATER AND BEVERAGE BOTTLES

This application claims the benefit of U.S. Provisional Application No. 60/626,119, filed Nov. 8, 2004.

BACKGROUND OF THE INVENTION

1. Field of the Invention

This invention relates to an apparatus for accessorizing water and beverage bottles, including a water mister, a portable humidifier, a vitamin or nutritional supplement dispenser, and other useful accessories.

2. Description of Related Art

People carry and drink bottled water for health and hydration. Bottled water is very convenient and can be purchased anywhere. With the modern active lifestyle, many people desire the conveniences of having a mister or portable humidifier with them not only at home, but also at work and during recreational activities, including sports, golf, and outdoor activities. However, carrying around and transporting large humidifiers and misters can be inconvenient and impractical. Also, with the changing weather, one cannot always predict the need for a mister or portable humidifier.

In conjunction with a healthy lifestyle, there is also the need for healthy water and beverages. The current marketplace has enriched or enhanced beverages with vitamins and other nutritional supplements, but many of these supplements are not geared specifically for a particular application and may be loaded with undesired substances. However, there still is a need for vitamin or supplement enriched beverages.

The domestic and global market for beverages and bottled water is constantly growing and evolving. However, with this newfound competition, many companies need to provide greater incentives and value to consumers for continued sales in this competitive marketplace.

For the bottled water and beverage market, this invention provides a series of add-on accessories for specific or the common beverage and water bottle, including a water mister, a portable humidifier, a vitamin or nutritional supplement dispenser, and other useful accessories, which are quickly, easily, and removably attached to any commercially available consumer water or beverage bottle or container.

From the preceding descriptions, it is apparent that the devices currently being used have significant disadvantages. Thus, important aspects of the technology used in the field of invention remain amenable to useful refinement.

SUMMARY OF THE INVENTION

The purpose of the present invention is to provide add-on accessories for beverage and water bottles, including a water mister, a portable humidifier, a vitamin or nutritional supplement dispenser, and other useful accessories, which are quickly, easily, and removably attached to any commercially available consumer water or beverage bottle or container.

Another purpose of the present invention is to provide a portable mister or battery powered humidifier. Another purpose of the present invention is a way to add vitamins or nutritional supplements to water or beverage bottles while on the go or away from home in an easy and cost efficient manner. Another purpose is to provide an additional way to add value, function, and marketing to a bottle of water or a beverage.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIG. 1 is an exploded view of the energy capsule embodiment;

FIG. 2 is an exploded view of the portable humidifier;

FIG. 3 is a cross-sectional view of the portable humidifier;

FIG. 4 is an exploded view of the water mister;

FIG. 5 is a side view, which shows the interior of the water mister embodiment;

FIGS. 6A and 6B are exploded views of embodiments of the water mister embodiment;

FIGS. 7A, 7B, and 7C are cross-sectional and partial views of embodiments of the water mister embodiment in a first or upright position;

FIGS. 8A, 8B, and 8C are cross-sectional and partial views of embodiments of the water mister embodiment in a second or upside-down position;

FIGS. 9A and 9B are exploded views of another embodiment of the water mister embodiment;

FIGS. 10A, 10B, and 10C are cross-sectional and partial views of embodiments of the water mister embodiment in a first or upright position;

FIGS. 11A, 11B, and 11C are cross-sectional and partial views of embodiments of the water mister embodiment in a second or upside-down position;

FIGS. 14A and 14B are cross-sectional and partial views of another embodiment of the water mister;

FIGS. 15A and 15B are cross-sectional and partial view of another embodiment of the water mister;

FIGS. 16A and 16B show another embodiment of the water mister;

FIGS. 17A and 17B show cross-sectional views of the water mister when in a second or upside-down position;

FIGS. 18A and 18B show cross-sectional views of the water mister;

FIGS. 19A and 19B show cross-sectional views of the water mister in the return to the first or upright position, with liquid in the inner chamber of the mister;

FIG. 20 is another embodiment of the water mister;

FIG. 21 is a view of the water mister in a second or upside-down position and the arrow shows the flow of water or liquid into the mister and the second position of the ball valve;

FIG. 22 is an exploded view of another embodiment of the mister;

FIG. 23 is another embodiment of the water mister;

FIG. 24 is a view of the water mister with a closing cap;

FIG. 25 is an exploded view of the water mister and closing cap;

FIG. 26 shows the mister being screwed onto the bottle;

FIG. 27 shows the mister and bottle assuming a second or inverted or upside-down position to fill the mister with liquid;

FIG. 28 shows the mister returning to a first or upright position and the arrow shows the direction the user needs to press the activation button to release a mist of liquid out of the apparatus or nozzle;

FIG. 29 is a cross-sectional view of the energy capsule embodiment in a first position;

FIG. 30 is a cross-sectional view of the energy capsule embodiment in a second or activation or release position;

FIG. 31 is an exploded view of the energy capsule;

FIG. 36 shows one version of the portable humidifier;

FIG. 37 shows a cross-sectional view of the portable humidifier;

FIG. 38 shows an exploded view of the portable humidifier;

FIG. 50 is an alternate embodiment of a bottle accessory for tissues or wipes;

FIGS. 51-61 show alternate embodiments of the portable humidifier;

FIGS. 62-72 show alternate embodiments of the water mister; note FIGS. 67-69 show the water mister being attached to a carrying strap, a backpack, and a golf bag;

FIG. 73 shows another embodiment of the energy or supplement capsule attachment for water and beverage bottles and containers;

FIG. 74 shows one version of the energy capsule embodiment;

FIG. 75 shows one version of the energy capsule in a first or non-active position;

FIG. 76 shows one version of the energy capsule in a second or active position;

FIG. 77 shows the energy capsule placed and activated on a bottle;

FIG. 78 is an exploded view of the energy capsule;

FIG. 79 is an alternative embodiment of the energy capsule with a push or activation button for releasing the contents of the energy capsule;

FIG. 80 is an exploded view of another embodiment of the energy capsule;

FIG. 88 is another exploded view of another embodiment of the water mister apparatus.

FIGS. 89-93 show various views of the water mister apparatus.

DESCRIPTION OF THE PREFERRED EMBODIMENTS

Figure 12:
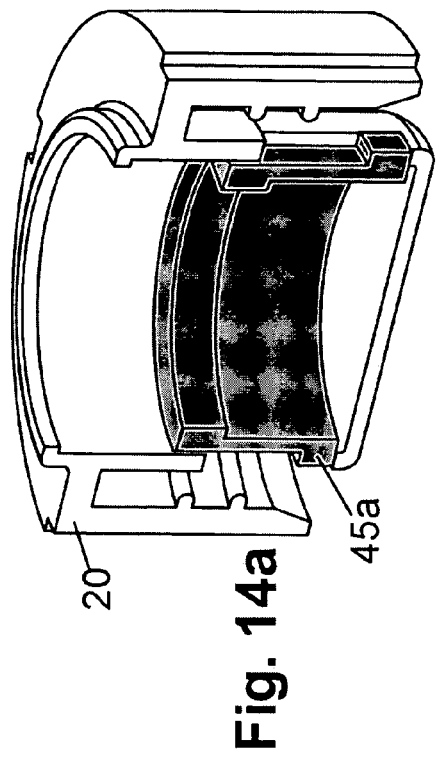
FIG. 12 is another embodiment of the water mister.
Figure 14A:
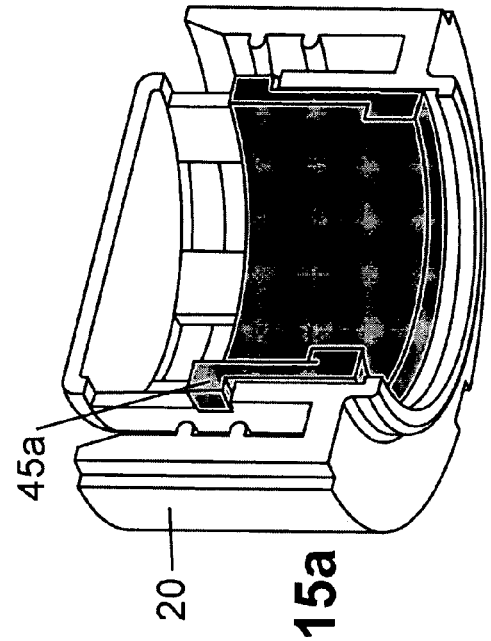
Figure 13:
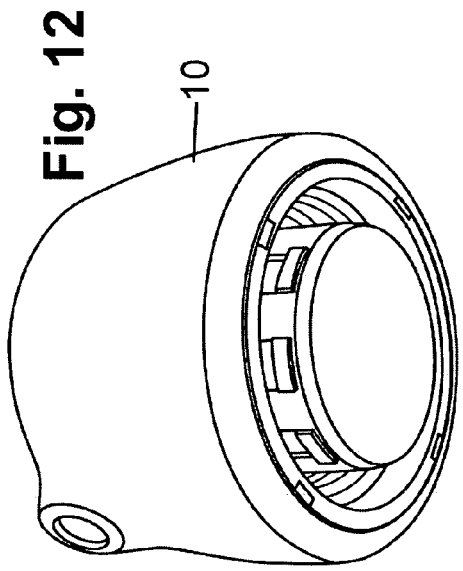
FIG. 13 is another view of the water mister without the outer cover.
Figure 15A:
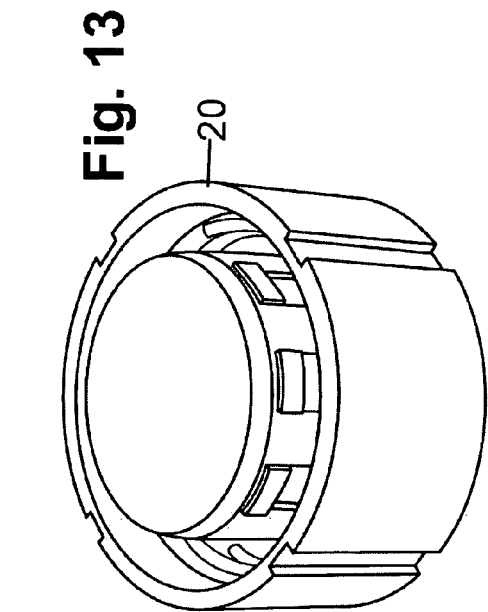
Figure 18B:
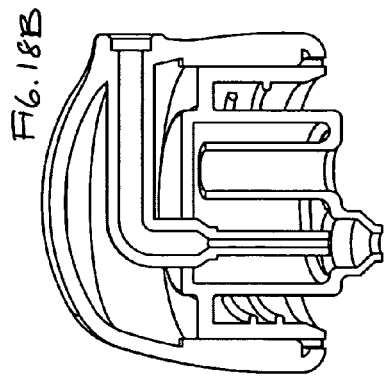
Figure 19B:
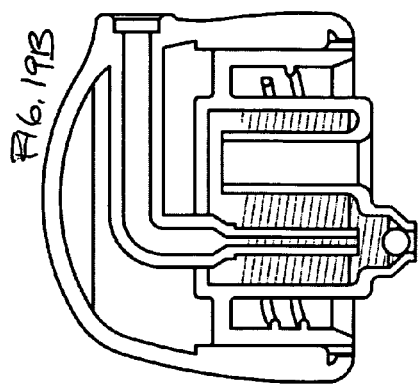
Figure 16B:
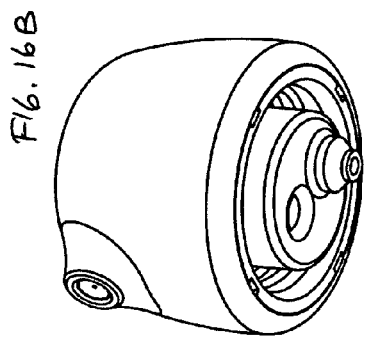
Figure 17B:
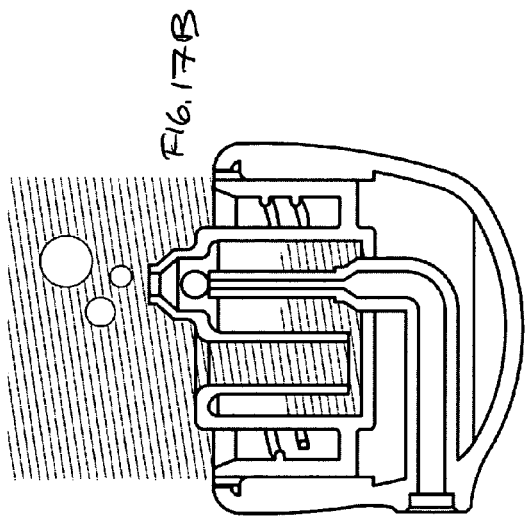
Figure 35:
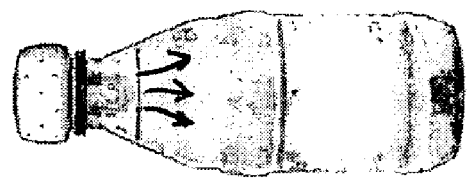
FIG. 35 shows the energy capsule fully screwed on and attached to a bottle and a second position.
Figure 34:
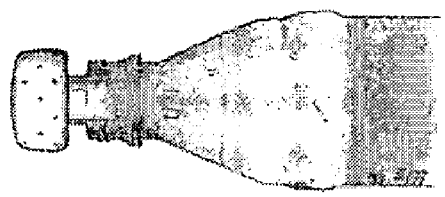
FIG. 34 shows the energy capsule being placed on a bottle or a first position.
Figure 33:
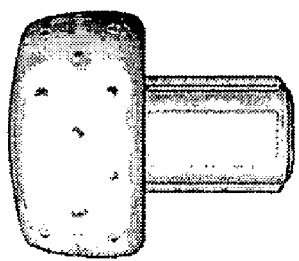
FIG. 33 shows the energy capsule in a first position.
Figure 32:
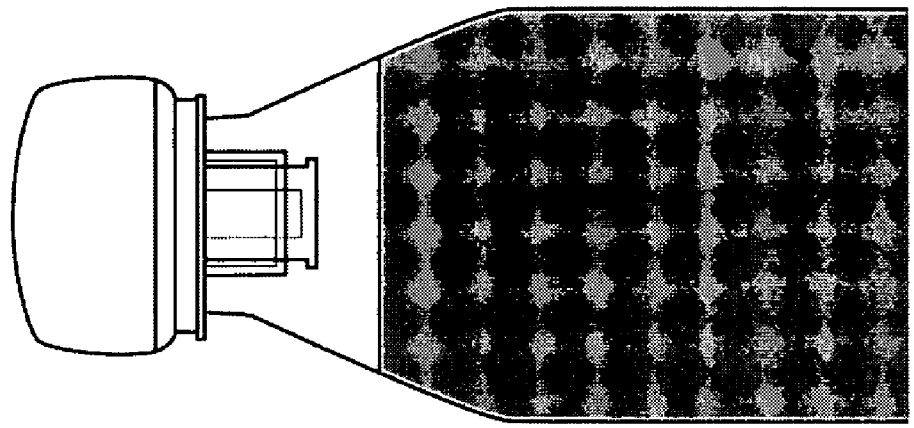
FIG. 32 shows the energy capsule placed on a bottle.
Figure 41:
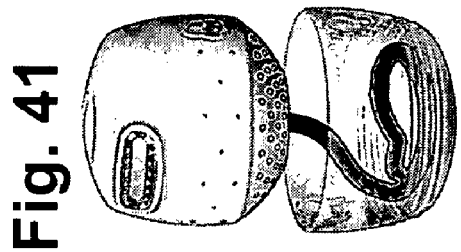
FIG. 41 shows a view of the portable humidifier being placed into its cover.
Figure 43:
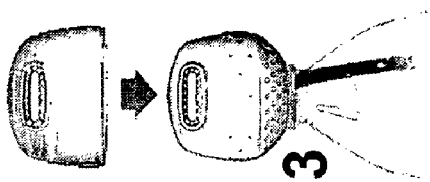
FIG. 43 shows a view of the portable humidifier on a bottle and the cover being placed on top of the apparatus.
Figure 40:
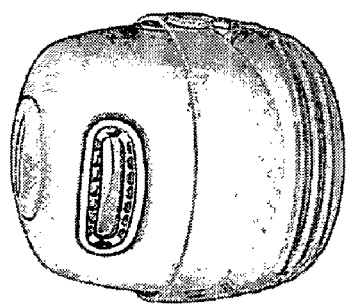
FIG. 40 shows a view of the portable humidifier in a storage position and placed in its cover.

This invention discloses several apparatuses and add-on accessories for beverage and water bottles, including a water mister, a portable humidifier, a vitamin or nutritional supplement dispenser, and other useful accessories, which are quickly and easily attached to and removed from any commercially available consumer water or beverage bottle or container. FIG. 1 shows an energy capsule or nutritional or vitamin supplement attachment 06; FIGS. 2-3 shows a portable humidifier 04; FIGS. 4-5 shows water or liquid mister apparatus 02.

Water Mister:

As shown in FIGS. 4-28, there is illustrated a water mister 02 or an apparatus for misting water or liquid. Viewing FIG. 4, this water mister 02 comprises an outer housing 10, a spray nozzle 15, an inner housing 20, a cap 25, a spring 35, a water pump 40, and a valve 45. The cap 25 may also have a cap handle 30 and may also be threaded to securely attach and to mate to the inner housing. The inner housing 20 may be threaded to securely attach, to mate, and to engage the threaded portion of the flange of a water or beverage bottle opening. In another embodiment of the invention, the outer housing 10 may also have threading to securely attach, to mate, and to engage the threaded portion of the flange of a water or beverage bottle opening.

The water mister 02 embodiment shown in FIGS. 4-5 employs a ball valve 45, but this invention allows for different types of valves 45, as shown in FIG. 6-15.

These parts for the water mister may be comprised of, but not limited to, plastic, composites, metals, alloys, injection molded polypropylene or injected molded thermoplastic rubber.

Water Mister:

As shown in FIGS. 6-8, there is another embodiment of the basic water mister as described above and in FIGS. 4-5. FIG. 6A, 6B show exploded views of this water mister embodiment 02, which comprises an outer housing 10, a spray nozzle 15, an inner housing 20, a cap 25, 30 cap handle, a spring 35, a water pump 40, and a valve 45.

This embodiment does not employ a ball valve as in FIGS. 4-5, but uses an inner cylinder valve 45a. This inner cylinder valve 45a fits, slides, and moves within the cavity 50 of the inner housing and assumes a first (closed) position as shown in FIGS. 7A-C and a second (open) position as shown in FIGS. 8A-C. Valve 45a assumes a first or closed position when the water mister apparatus is at rest and placed on a water bottle (upright position). Valve 45a assumes a second or open position when the water mister and bottle are inverted and upside-down.

The shape of the inner valve 45a can be circular and cylinder shaped, but it can also be shaped to mimic the cavity of the inner housing and assume different shapes such as a triangle, square, or irregular shapes. The inner valve 45a can easily slide from the first to the second position. In another embodiment, the inner valve 45a can assume a male-female coupling by fitting and sliding within inner water mister housing 20.

In addition, the inner valve can have an inner valve wall 170. The inner valve can substantially mimic the width and shape of the inner housing chamber and have a height less than of the inner housing (along a vertically central axis of the apparatus), but the inner valve needs to be able to move along a desired direction within the chamber of the inner housing.

The inner cylinder valve 45a can have at least one or a multiple or a plurality of inner cylinder valve openings 55. These openings can be any desired shape, and FIGS. 7-8 show rectangular openings, slots, windows or apertures. These openings 55 are located near the first terminal end 65 of the inner cylinder valve 45a. There is also a second terminal end 70 of the valve.

The inner valve 45a has a first surface (outer) 150 and a second surface (inner) 155; the inner valve 45a also has valve flanges or ribs 145 on the first or outer surface 150; these flanges or ribs 145 correspond to and are located proximate to the opening 60 of the inner housing. These flanges can lie within the opening 60 and allow for movement of the valve from a first position to a second position on the opening 60 during operation of this invention. The flange and rib 145 enable the inner cylinder valve to move a measured or certain distance in order to properly align all of the openings and windows 55, 60, and 120 from the first to second and back to the first position. The inner valve 45 can close multiple openings.

Inner Housing 20:

The inner housing 20 also comprises a first wall 110 and a second wall 115. The second wall 115 of the inner housing may have at least one or a plurality or multiple inner housing openings 60 and 120 ("second" inner housing opening 60 and "first" inner housing opening 120). The second wall has a first end 125 and a second end 130; the first inner housing opening 120 is located adjacent or proximate to the first end 125, and the second inner housing opening 60 is located adjacent or proximate to the second end 130.

In addition, this invention allows for the location of the inner valve and inner housing openings on various locations. In one preferred embodiment as shown in FIGS. 6-8, the openings of the inner valve are offset from the inner housing openings in the first or closed apparatus position, and when the apparatus achieves the second or open or upside-down position, the inner valve openings match and line up with the inner housing to allow the entrance/exit of liquid and/or air bubbles.

The inner housing 20 has at least one surface 75; this inner housing, outer housing, and valve can each have at least one surface. The inner housing 20 has a first surface 80, a second surface 85, a third surface 90 (may be threaded to engage the corresponding threads on a water or beverage bottle opening), and a fourth surface 95 (inside the inner housing cavity). The second and third inner housing surfaces 85 and 90 form and define a space 100 within the inner housing, wherein the threaded flange of the water bottle will occupy, when this apparatus is twisted on and engaged to a water or beverage bottle opening.

As shown in cross-sectional views of FIGS. 7A-C, in the first or closed position, the inner cylinder valve openings 55 are blocked by the fourth surface of the inner housing; both the inner housing openings (second inner housing opening 60 and first inner housing opening 120) are blocked by the inner cylinder valve 45a.

In addition, the inner housing end and the first and second walls of the inner housing can define an engagement area 160 for a bottle opening. The first and second inner housing ends and the second inner housing wall can also define a chamber wherein lies the movable inner valve 45a.

When the water mister 02 is placed on a water or beverage bottle, which contains a liquid, and inverted to assume a second or open position (see FIGS. 8A-C), the inner cylinder valve 45a will move to the second position. With this valve movement and gravity, the valve 45a assumes a second position wherein the first inner housing opening 120 of the second wall of the inner housing corresponds, aligns, and lines up with the opening 55 of the inner cylinder valve so that water or liquid may enter the inner cavity of the inner housing. At the same time, any air may escape through the opening or window 60 of the inner housing. In addition, water may enter through opening 60, and air may also leave through openings 55 and 120.

When the user uprights the water bottle and water mister apparatus, the valve 45a will assume the first or closed positions, and this restoring movement (back to the first position) of the valve 45a will close the openings 55, 120, and 60. Any water or liquid that flowed through these openings is now trapped in the inner cavity and chamber of the inner housing. This liquid holding chamber is formed by the second or inner surface of the inner cylinder valve and the third wall 135 of the inner housing. The third wall 135 forms a "floor" of the inner housing in the first or closed position or a "roof" in the second or closed position (see FIGS. 7A-C and FIGS. 8A-C).

With liquid trapped in the inner chamber of the inner housing, the user can push the top of the outer housing 10 or a spray activation area 165 on the outer housing to activate the water pump and spring to eject the contents of the inner housing through the nozzle 15 of the apparatus and a fine mist of liquid. Depending on the amount of liquid trapped in the inner housing, the user may push the top of the outer housing multiple times to eject out the remaining liquid.

Another possible embodiment for the water mister is to place a cartridge or dissolvable substance such as a scent or flavoring within the inner chamber, which would partially dissolve upon contact with the liquid when the water mister assumes the second or inverted position and liquid flows into the cavity of the inner housing and through the openings 55. This cartridge of dissolvable substance should not interfere with the moving or action of the inner cylinder valve or openings 55, 60, or 120.

Please note that the nozzle may be integrated into the outer housing; other embodiments may allow the inner housing and valve to be movable with respect to each other but integrated with the outer housing. Instead of connecting to the inner housing, other embodiments can allow the outer housing to connect to the threaded opening of a water or beverage bottle.

Based on the particular embodiment, this invention can be customized to generic water or beverage bottles or made specific to one particular type or brand of beverage of water bottle. This flexibility allows for maximizing the marketing and branding of this invention for a particular company, product, or business. The outside of the housing of the water mister may be branded or marked with logos or marks.

FIGS. 9-11 shows another embodiment of the water mister with the inner cylinder valve 45a. The inner cylinder valve 45a in FIGS. 9-11 has inner cylinder valve flanges or ribs 140, which correspond to the openings 120 of the inner housing. Similarly, the embodiment as shown in FIGS. 6-8 further has valve flanges or ribs 145, which correspond to the opening 60 of the inner housing. Both these flanges and ribs 140, 145 enable the inner cylinder valve to move a measured distance in order to properly align all of the openings and windows 55, 60, and 120 from the first to second and back to the first position.

Additionally, these flanges and ribs 140, 145 further prevent unwanted rotational movement around a center vertical axis of the apparatus. These flanges and ribs can help in allowing movement of the inner valve along the axis of the center vertical axis, but this invention also allows for embodiments that do not have any flanges or ribs. These additional embodiments would have the length (along the central vertical axis of the apparatus) of the inner valve be smaller than the length of the inner housing. By allowing for a lesser length of the inner valve, this apparatus allows for the inner valve to move from the first or closed position to the second or open position and movement along the central vertical axis of the apparatus.

FIGS. 12-15 show another embodiment of the water mister invention with a inner cylinder valve 45a; FIGS. 14A, 14B show the valve 45a in the first or closed position with the bottle and mister upright; FIGS. 15A, 15B show the valve 45a in the second or closed position with the bottle and mister upside down. FIGS. 16-19 and 20-22 show other embodiments of the water mister employing a ball valve.

In addition, the water pump can be a variety of different types of water or liquid pumps currently out on the market, and this invention should not be limited to the particular pump as shown in the drawings. Further, these water pumps can be manual or electrically driven as well.

Operation of the Water Mister:

The user will take off the cap of the water mister (FIG. 25) and place the water mister onto a water or beverage bottle (FIG. 26). Once the water mister is securely fastened on the water or beverage bottle (either by twisting to securely engage the complementary threads on the water bottle and the water mister or by other male/female connections), the user will invert the bottle and water mister (FIG. 27) to move the valve 45 or 45a from a first (closed) position to a second (open position) and the inner housing will fill with water or liquid. The user will upright the bottle and water mister (FIG. 28) and press on the top of the outer housing to activate the water pump and spring to eject and to release the contained water or liquid from the inner housing and through the nozzle to form a nice mist or spray. The user can repeat these actions as necessary to provide a simple and elegant way to convert any water or beverage bottle to an effective and portable water mister. The cover of the water mister may also have a handle or clip so that a user can place a leash on the water mister; the water mister can be placed on a backpack or a golf bag (FIGS. 67-69).

One of the main advantages of this water mister invention is to avoid having to use a tube or wick to draw water up into the water pump for misting and spraying. By not using a tube or wick, the user can easily take off the water mister apparatus and drink from the same bottle. This invention allows the user to avoid having getting the wick or tube in the way of drinking out of the bottle and spilling liquid.

Other products have structures, which screw on a bottle, but these products lie (partially or almost completely) within the bottle. And, these products suffer from the same problems of getting in the way when the user wants to drink or access the liquids in the bottle. The instant invention and application provides an elegant solution for being able to use gravity and inverting the bottle to fill the inner housing of the water mister with liquid and to avoid using a wick or tube. Another advantage of this structure is to allow for easy access to all types of bottles; since the applicant's structure is not placed within the body of the bottle, there are no space or size limitations. Further, since this invention can be sold or added after the initial purchase of the water or beverage, there is greater opportunity for marketing and sales of this product.

Energy Capsule—Nutritional or Vitamin Supplement Apparatus for a Water or Beverage Bottle.

As shown in FIG. 1, there is an attachment apparatus for a water or beverage bottle to provide nutritional or vitamin supplements for the contents of the bottle or an "energy capsule 06." This energy capsule 06 is comprised of a bottle cap 500 and shell 505. The bottle cap 500 fits and lies within the shell 505 with a male-female engagement; the bottle cap 500 would be the male piece; the shell 505 would be the female piece.

The bottle cap and shell/sleeve can be comprised of various materials including but not limited to injection molded polypropylene or other plastics or injection molded acrylic. The shell and the bottle cap can be comprised of clear and see-through material to enable the user to view the nutritional supplement or vitamins being released in the second or active position from a sealed or first or in-active position. The bottle cap also has structures or threads to engage and to connect with the threaded portion of the flange of a water or beverage bottle opening.

One of motivations for creating this "energy capsule" embodiment was to provide a cost-effective and inexpensive way to augment and to enhance beverages and plain bottled water to compete with already enhanced water and beverages or large cumbersome vitamin pills. One of the solutions was to make this unit into two basic pieces: the bottle cap and the shell. When the user attaches the energy capsule apparatus to a water or beverage bottle, the outer shell will automatically move up from a first (inactive or closed) position to a second (active or open) position to release the vitamin power, liquid, gel, or nutritional supplement. The user can simply shake the bottle, remove the energy capsule attachment, drink, and enjoy the enhanced beverage or water. This energy capsule invention allows a simple and cost-effective way to add supplements to basic bottled water.

FIGS. 29-35 shows more detail of the energy capsule attachment. FIG. 31 shows an exploded view of the energy capsule's two components: the bottle top 500 and the shell or sleeve 505. The bottle cap comprises a head 510 and a body 515. The head has at least one surface and can have a first (outer) surface 520 and a second (inner) surface 525. This inner surface can have threads 530 or parts to engage the opening of the water bottle. The head has a first end 535 (top) and second end 540 (bottom).

The body of the bottle cap arises from the head to form a cylindrical shape and extends away from the bottom or second end 540 of the head. The body may have at least one or a plurality of channels, windows, holes or apertures 545 that may extend from the length of the body. The body has a first end 550 and second end 555. The first end 550 of the body terminates into the inner surface of the head; the second end 555 of the body is closed and terminal and forms a temporarily sealed end in conjunction with the clear sleeve in the first or closed position. Please note that the openings 545 can be along the sides 560 of the body.

The shell or sleeve 505 is constructed to mimic the shape of the body 515 of the bottle cap. The sleeve 505 has a first end 565, which forms a flange 575, which can engage the threads of the second surface of the head; the sleeve has a second end 570 and is open. This sleeve second end 570 works in conjunction with the second end 555 of the bottle cap's body to form a temporarily closed end 580 in the first or closed position for the energy capsule device. When the device is activated in the second position, the user will twist the body further into the sleeve and the second end of the body will extend past the second end of the sleeve and release the contents of the vitamin/nutritional mixture 585, which is stored within the bottle top. When the user shakes the bottle, the liquid is able to penetrate and enter through the exposed openings 545 of the body of the bottle top.

FIG. 29 shows the energy capsule in the first or closed or inactive position. This would be form of the device when sold as a retail product. The user would remove any protective packaging or cellophane and place the device 06 on the water bottle and twist to achieve the second or open or active position (FIG. 30). In the second position, the clear sleeve moves from a first or lower position to a second or higher position and allows any vitamin/nutritional supplement gel, powder, or mix to be released from inside the bottle cap through the clear shell's openings.

In another embodiment, the energy capsule may be activated from a first to a second position by a providing enough twisting pressure to break some partially broken connections with the threads on the head of the bottle cap.

Portable Humidifier:

Viewing FIGS. 2-3, this invention also discloses a portable humidifier 04, which can be powered by a battery 345 or solar cells 350 (not shown), which would be located on the outer surface of a main housing 315. This portable humidifier 04 comprises an outer cover 300, a cover vent 305, a battery cap 310, a humidifier main housing 315, a humidifier main housing vent 320, a fan 325, a wick or flexible tube 330, a water filter 335, a fan electric motor 340, and a battery or power source 345 for the fan electric motor and fan. The humidifier main housing 315 has threading or engagement parts 355 to securely attach, to mate, and to engage the threaded flange of the opening of a water or beverage bottle.

Figure 42:
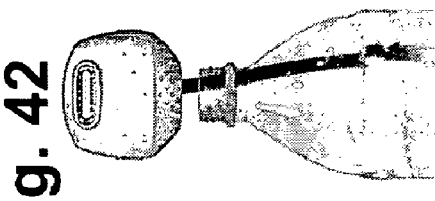
FIG. 42 shows a view of the portable humidifier being positioned on a bottle.
Figure 39:
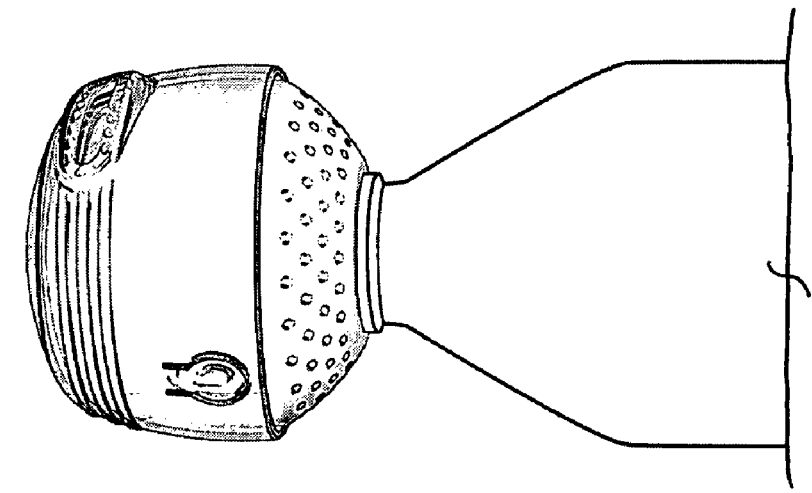
FIG. 39 shows a view of the portable humidifier on a bottle.
Figure 46:
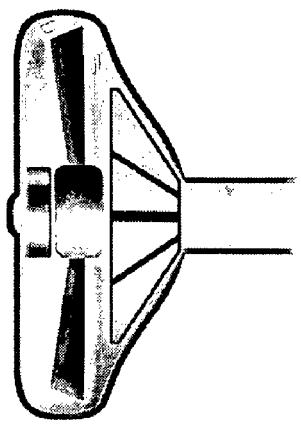
FIGS. 44-47 show alternate embodiments of the portable humidifier.
Figure 47:
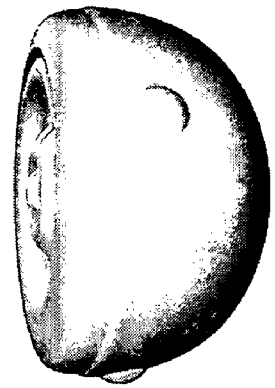

As shown in FIGS. 36-43, this invention also describes a portable humidifier. The outer cover serves two purposes; when the humidifier is being used, it fits securely over the outside of the main body of humidifier and has an opening for the vent hole. When being stored, the humidifier and the wick fit within the outer cover as shown in FIG. 42 to form a compact and secure case during non-use.

Figure 45:
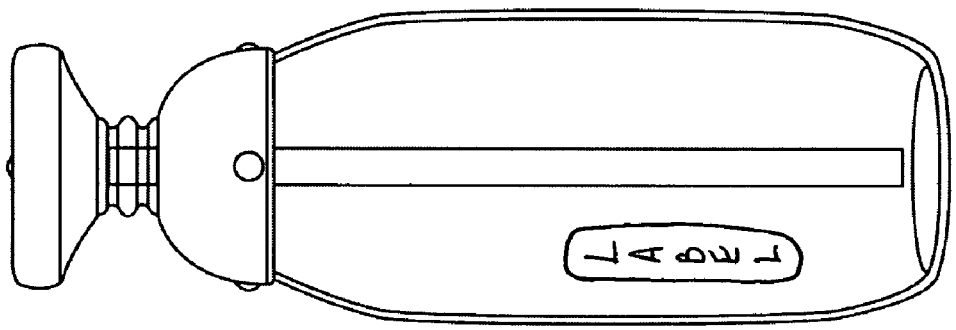
Figure 44:
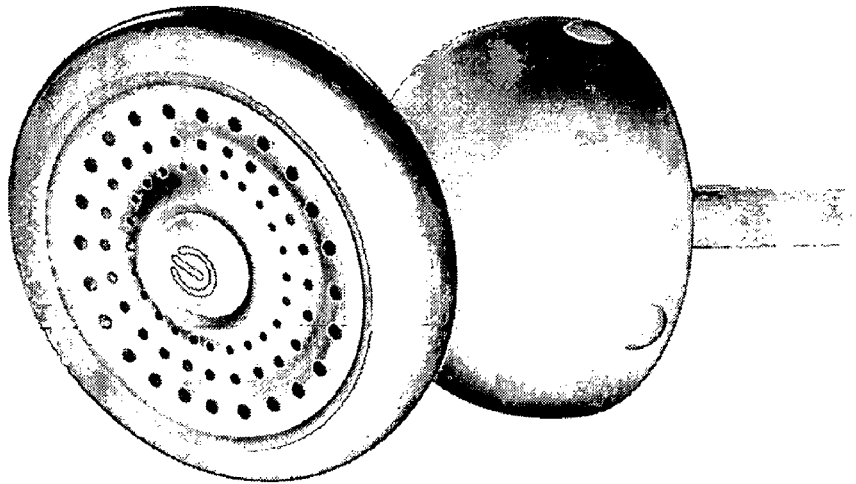

FIGS. 44-47 shows other embodiments of the portable humidifier. In FIG. 45, the outer cover fits around the top portion of the bottle during the use of the humidifier, and during storage, the outer cover acts as a case for the humidifier. As with the mister, this portable humidifier's parts may be comprised of, but not limited to, plastic, composites, metals, alloy, injection molded polypropylene or injected molded thermoplastic rubber.

Figure 49:
FIGS. 48-49 show alternate embodiments of the invention for water and beverage bottles for pet drinking.
Figure 48:
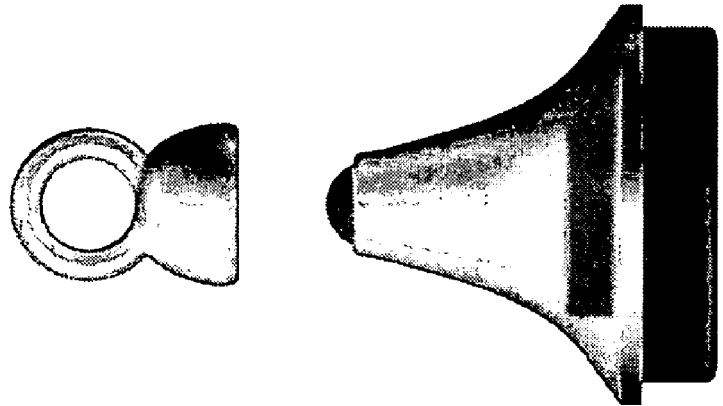
Figure 81:
FIG. 81 shows several (3) views of another embodiment of the portable humidifier.
Figure 82:
FIG. 82 is another embodiment of accessory for water bottle for integrating nutritional supplements or vitamins to water and beverage bottles.
Figure 83:
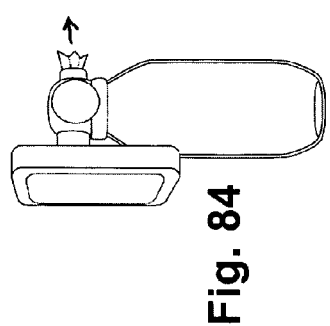
FIG. 83 is another embodiment for a water spray.
Figure 84:
FIG. 84 is another embodiment for adapting a water bottle for moistening tissues or wipes; this could also be adapted for bottles for mild cleaning solutions.
Figure 85:
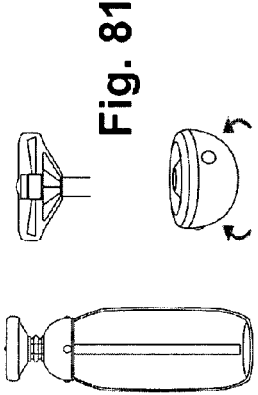
FIG. 85 is another embodiment for a drip watering system.
Figure 86:
FIG. 86 is another embodiment for a pet feeding or watering system.
Figure 87:
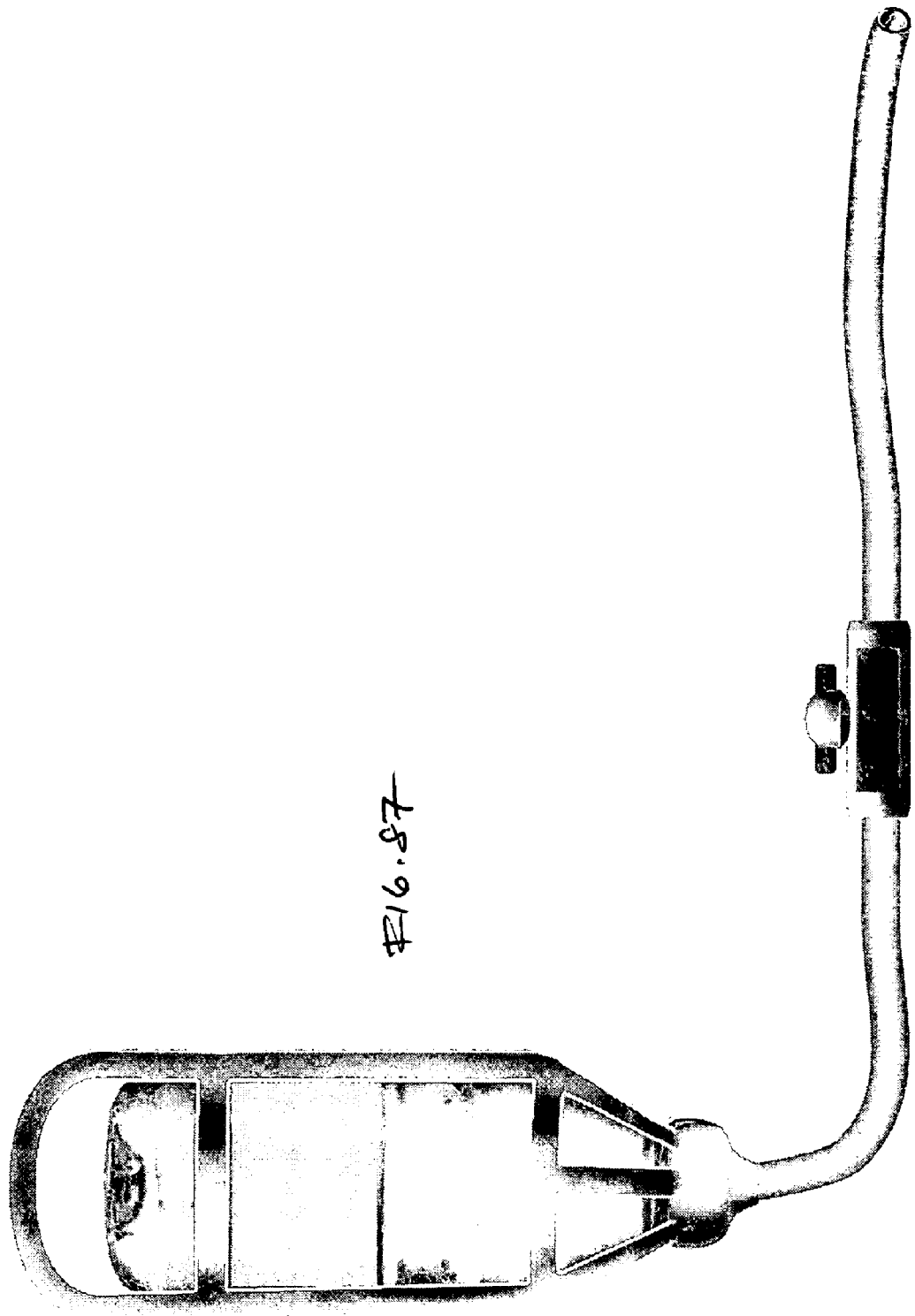
FIG. 87 is another embodiment for a pet feeding or watering system.

FIGS. 48-49 shows another attachment for the water or beverage bottle to enable the user to easily water their pet using a release valve. FIG. 50 shows another attachment for moistening tissues or towels with a water bottle. FIGS. 79-80 show another embodiment of the energy capsule where the liquid or gel is contained within a container, which is attached to a main housing and rubber activation pad; the container has openings for releasing the gel or liquid. After placing the apparatus on a beverage or water bottle, the user simply pushes the activation pad to release the gel or liquid that was contained in the liquid container sleeve into the body of the water bottle. The liquid container sleeve will go from a first inactive position to a second active position, when the activation pad is depressed by the user.

In another embodiment of the portable mister, the tube or wick can be replaced with the inner housing and valve structures as described above with the water mister embodiment so that the user would have to move the water bottle and the humidifier from a first or upright position to fill the inner housing with liquid to a second or inverted position.

An apparatus for spraying a liquid comprising an outer housing having a spray nozzle and a spray activation area; the outer housing contains an inner housing; sandwiched between the inner housing and the outer housing are a spring and a water pump; the inner housing 20 has a first inner housing end 175 and a second inner housing end 180; the first inner housing end has at least one first inner housing end opening 185 to engage the water pump; arising from the first inner housing end is an outer flange 190; the outer flange develops into a first wall of the inner housing; arising from a different location on the first inner housing end is a second wall of the inner housing; the first and second walls of the inner housing are substantially parallel to each other; on the second wall of the inner housing and proximate to the first inner housing end is at least one first inner housing opening; on the second wall of the inner housing and proximate to the second inner housing end is at least one second inner housing opening; the first inner housing end and the first and second walls of the inner housing define an engagement area for a bottle opening; the first and second inner housing ends and the second inner housing wall define a chamber wherein lies a movable inner valve; the inner valve has an inner valve wall; the inner valve has a first inner valve end and second inner valve end and substantially mimics a width and a shape of the inner housing chamber and has a height less than of the inner housing; the first and second inner valve ends are open; proximate to the first inner valve end, there is at least one inner valve end opening on the inner valve wall; proximate to the second inner valve end is an inner valve end flange, which lies partially within the at least one second inner housing opening; the inner valve end flange is oriented relatively perpendicular to a centrally vertical axis of the apparatus; in a first apparatus position, the inner valve blocks both the at least one first and second openings of the inner housing; in a second apparatus position, the inner valve moves and relocates within the inner housing such that the at least one first and second end openings of the inner housing are no longer blocked by the inner valve whereby the liquid can enter the chamber, and when said apparatus is returned to the first apparatus position, said liquid remains within the chamber due to the inner valve blocking the at least one first and second openings of the inner housing, by applying an external pressure to the spray activation area of the outer housing, the spring and the water pump expel the liquid through the nozzle to form a mist.

An apparatus for spraying a liquid comprising an outer housing having a spray nozzle and an activation area; the outer housing contains an inner housing; sandwiched between the inner housing and the outer housing are a spring and a water pump; the inner housing has first inner housing end and a second inner housing end; the first inner housing end has at least one first inner housing end opening to engage the water pump; arising from the first inner housing end is an outer flange; the outer flange develops into a first wall of the inner housing; arising from a different location on the first inner housing end is a second wall of the inner housing; the first and second walls of the inner housing are substantially parallel to each other; on the second wall of the inner housing and proximate to the first inner housing end is at least one first inner housing opening; proximate to the second inner housing end is at least one second inner housing opening; the first inner housing end and the first and second walls of the inner housing define an engagement area for a bottle opening; the first and second inner housing ends and the second inner housing wall define a chamber wherein lies a movable inner valve, which has a inner valve wall; the inner valve has a first inner valve end and second inner valve end and substantially mimics a width and a shape of the inner housing chamber and has a height less than of the inner housing along a vertically central axis of the apparatus; the first and second inner valve ends are open; proximate to the first inner valve end, there is at least one inner valve end opening on the inner valve wall;

proximate to the first inner valve end is a flange, which lies partially within the at least one first inner housing opening; in a first apparatus position, the inner valve blocks both the at least one first and second openings of the inner housing; in a second apparatus position, the inner valve moves and relocates within the inner housing such that the at least one first and second end openings of the inner housing are no longer blocked by the inner valve whereby the liquid can enter the chamber, and when said apparatus returns to the first apparatus position, said liquid remains within the chamber due to the inner valve blocking the at least one first and second openings of the inner housing, and by applying an external pressure to the spray activation area of the outer housing, the spring and the water pump expel the liquid through the nozzle to form a mist.

An apparatus for spraying a liquid comprising an outer housing having a spray nozzle and an activation area; the outer housing contains an inner housing; sandwiched between the inner housing and the outer housing are a spring and a water pump; the inner housing has first inner housing end and a second inner housing end; the first inner housing end has at least one first inner housing end opening to engage the water pump; arising from the first inner housing end is an outer flange; the outer flange develops into a first wall of the inner housing; arising from a different location on the first inner housing end is a second wall of the inner housing; the first and second walls of the inner housing are substantially parallel to each other; in the second wall of the inner housing and proximate to the first inner housing end is at least one first inner housing opening; on the second wall of the inner housing and proximate to the second inner housing end is at least one second inner housing opening; the first inner housing end and the first and second walls of the inner housing define an engagement area for a bottle opening; the first and second inner housing ends and the second inner housing wall define a chamber wherein lies a movable inner valve; the inner valve has a first inner valve end and second inner valve end and substantially mimics a width and a shape of the inner housing chamber and has a height less than of the inner housing; proximate to the first inner valve end, there is at least one inner valve end opening; in a first apparatus position, the inner valve blocks both the at least one first and second openings of the inner housing; in a second apparatus position, the inner valve moves and relocates within the inner housing such that the at least one first and second end openings of the inner housing are no longer blocked by the inner valve whereby the liquid can enter the chamber, and when said apparatus returns to the first apparatus position, said liquid remains within the chamber due to the inner valve blocking the at least one first and second openings of the inner housing, and by applying an external pressure to the spray activation area of the outer housing, the spring and the water pump expel the liquid through the nozzle to form a mist.

The apparatus further comprises a flange, which is located proximate to the second inner valve end and lies partially within the at least one second inner housing opening. The apparatus further comprises a flange, which is located proximate to the first inner valve end and lies partially within the at least one first inner housing opening. The apparatus further comprises a cap, which removably attaches to the engagement area of the inner housing.

While the invention as described above in connection with preferred embodiments, it will be understood that it is not intended to limit the invention to those embodiments. On the contrary, it is intended to cover all alternatives, modifications, and equivalents as may be included within the spirit and scope of the invention as defined by the appended claims. Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

PARTS LIST 02 water mister apparatus
04 portable humidifier apparatus
06 energy capsule apparatus Mister Parts:
10 outer housing
15 spray nozzle
20 inner housing
25 cap
30 cap handle
35 spring
40 water pump
45 valve
45a inner cylinder valve
50 cavity of inner cylinder
55 inner cylinder valve openings
60 inner housing openings "second" (near second end 130)
65 $1^{st}$ end of the inner valve;
70 $2^{nd}$ end of the inner valve;
75 surface of the inner housing
80 first surface of the inner housing
85 second surface of IH
90 third surface of the IH (threaded)
95 fourth surface of IH (cavity inside)
100 space formed by $2^{nd}$ and $3^{rd}$ surfaces for the threaded flange of the water bottle;
110 first wall of inner housing
115 second wall of inner housing
120 inner housing opening—"first" (near first end 125)
125 first end of second wall of inner housing;
130 second end of second wall of inner housing;
135 third wall of inner housing (roof)
140 inner cylinder flange or rim of valve
145 inner cylinder flange or rim of valve
150 first surface (outer) of the inner valve
155 second surface (inner) of the inner valve
160 engagement area on inner housing for bottle opening
165 spray activation area on outer housing
170 inner valve wall Humidifier Parts:
300 cover
305 cover vent
310 battery cap
315 main housing
320 main housing vent
325 fan
330 wick
335 water filter
340 electric motor
345 battery/power source
350 solar cells
355 threads for connecting to water bottle Energy Capsule Parts:
500 bottle cap
505 shell
510 bottle cap head 515 bottle cap body
520 head outer surface/first
525 head inner surface/second
530 threads of head of bottle cap
535 first end of head of bottle cap
540 second end of head of bottle cap
545 openings on the body of the bottle cap
550 first end of body of bottle cap
555 second end of body of bottle cap
560 sides of the body
565 first end of shell/sleeve
570 second end of shell/sleeve
575 flange of first end of sleeve/shell
580 closed end of the energy capsule in first position
585 vitamin/nutritional supplement

The invention claimed is:

1. An apparatus for spraying a liquid comprising:

An outer housing having a spray nozzle and a spray activation area;

The outer housing contains an inner housing,

Sandwiched between the inner housing and the outer housing are a spring and a water pump;

The inner housing has a first inner housing end and a second inner housing end;

The first inner housing end has at least one first inner housing end opening to engage the water pump;

Arising from the first inner housing end is an outer flange;

The outer flange develops into a first wall of the inner housing;

Arising from a different location on the first inner housing end is a second wall of the inner housing;

The first and second walls of the inner housing are substantially parallel to each other;

On the second wall of the inner housing and proximate to the first inner housing end is at least one first inner housing opening;

On the second wall of the inner housing and proximate to the second inner housing end is at least one second inner housing opening;

The first inner housing end and the first and second walls of the inner housing define an engagement area for a bottle opening;

The first and second inner housing ends and the second inner housing wall define a chamber wherein lies a movable inner valve;

The inner valve has an inner valve wall;

The inner valve has a first inner valve end and a second inner valve end and substantially mimics the width and the shape of the inner housing chamber and has a height less than of the inner housing;

The first and second inner valve ends are open;

Proximate to the first inner valve end, there is at least one inner valve end opening on the inner valve wall;

Proximate to the second inner valve end is an inner valve end flange, which lies partially within the at least one second inner housing opening;

The inner valve end flange is oriented relatively perpendicular to a centrally vertical axis of the apparatus;

In a first apparatus position, the inner valve blocks both the at least one first and second openings of the inner housing;

In a second apparatus position, which is the inverted first apparatus position, the inner valve moves and relocates within the inner housing such that the at least one first and second end openings of the inner housing are no longer blocked by the inner valve whereby the liquid can enter the chamber, and When said apparatus is returned to the first apparatus position, said liquid remains within the chamber due to the inner valve blocking the at least one first and second openings of the inner housing, and by applying an external pressure to the spray activation area of the outer housing, the spring and the water pump expel the liquid through the nozzle to form a mist.

2. The apparatus of claim 1 further comprising a cap, which removably attaches to the engagement area of the inner housing.

3. The apparatus of claim 1 further comprising a threaded surface on the engagement area of the inner housing.

4. An apparatus for spraying a liquid comprising:

An outer housing having a spray nozzle and an activation area;

The outer housing contains an inner housing,

Sandwiched between the inner housing and the outer housing are a spring and a water pump;

The inner housing has a first inner housing end and a second inner housing end;

The first inner housing end has at least one first inner housing end opening to engage the water pump;

Arising from the first inner housing end is an outer flange;

The outer flange develops into a first wall of the inner housing;

Arising from a different location on the first inner housing end is a second wall of the inner housing;

The first and second walls of the inner housing are substantially parallel to each other;

On the second wall of the inner housing and proximate to the first inner housing end is at least one first inner housing opening;

On the second wall of the inner housing and proximate to the second inner housing end is at least one second inner housing opening;

The first inner housing end and the first and second walls of the inner housing define an engagement area for a bottle opening;

The first and second inner housing ends and the second inner housing wall define a chamber wherein lies a movable inner valve;

The inner valve has a first inner valve end and a second inner valve end and substantially mimics the width and the shape of the inner housing chamber and has a height less than of the inner housing;

Proximate to the first inner valve end, there is at least one inner valve end opening;

In a first apparatus position, the inner valve blocks both the at least one first and second openings of the inner housing;

In a second apparatus position, which is the inverted first apparatus position, the inner valve moves and relocates within the inner housing such that the at least one first and second end openings of the inner housing are no longer blocked by the inner valve whereby the liquid can enter the chamber, and when said apparatus returns to the first apparatus position, said liquid remains within the chamber due to the inner valve blocking the at least one first and second openings of the inner housing, and by applying an external pressure to the spray activation area of the outer housing, the spring and the water pump expel the liquid through the nozzle to form a mist.

5. The apparatus of claim 4 further comprising a flange, which is located proximate to the second inner valve end and lies partially within the at least one second inner housing opening.

6. The apparatus of claim 4 further comprising a flange, which is located proximate to the first inner valve end and lies partially within the at least one first inner housing opening.

7. The apparatus of claim 4 further comprising a cap, which removably attaches to the engagement area of the inner housing.

\* \* \* \* \*